United States Patent
Watanabe et al.

(10) Patent No.: US 7,292,462 B2
(45) Date of Patent: Nov. 6, 2007

(54) DC/DC CONVERTER HAVING TRANSISTOR SWITCHES WITH FLYWHEEL DIODES AND PROGRAM FOR CONTROLLING THE TRANSISTOR SWITCHES

(75) Inventors: Yasuto Watanabe, Hidaka (JP); Mitsuaki Hirakawa, Tokyo (JP); Kouya Kimura, Asaka (JP)

(73) Assignee: Honda Motor Co., Ltd., Tokyo (JP)

( * ) Notice: Subject to any disclaimer, the term of this patent is extended or adjusted under 35 U.S.C. 154(b) by 298 days.

(21) Appl. No.: 11/047,688

(22) Filed: Feb. 2, 2005

(65) Prior Publication Data
US 2005/0174098 A1    Aug. 11, 2005

(30) Foreign Application Priority Data
Feb. 6, 2004    (JP) ............................. 2004-031311
Feb. 6, 2004    (JP) ............................. 2004-031324

(51) Int. Cl.
H02M 3/07    (2006.01)
(52) U.S. Cl. ........................ 363/60; 307/110
(58) Field of Classification Search ................. 363/59, 363/60; 307/110
See application file for complete search history.

(56) References Cited

U.S. PATENT DOCUMENTS

| | | | |
|---|---|---|---|
| 5,768,116 A * | 6/1998 | Kompelien | ................... 363/59 |
| 6,064,582 A * | 5/2000 | Luchner et al. | ................ 363/59 |
| 6,184,741 B1 * | 2/2001 | Ghilardelli et al. | ......... 327/536 |
| 6,198,645 B1 | 3/2001 | Kotowski et al. | |
| 6,418,040 B1 * | 7/2002 | Meng | ........................... 363/60 |
| 6,448,842 B2 * | 9/2002 | Zanuccoli et al. | .......... 327/536 |

FOREIGN PATENT DOCUMENTS

| JP | 2003-061399 A | 2/2003 |
|---|---|---|
| JP | 2003-111388 A | 4/2003 |
| WO | WO-00/45185 A2 | 8/2000 |

\* cited by examiner

*Primary Examiner*—Jeffrey Sterrett
(74) *Attorney, Agent, or Firm*—Birch, Stewart, Kolasch & Birch, LLP

(57) ABSTRACT

A DC/DC converter that is small, light, highly efficient, and inexpensive are provided which includes a DC power supply input section, a first and second capacitor connected in series, and an output section connected to the series connected first and second capacitors, a switching device that switches a plurality of switches which incorporate a configuration for connecting a power supply of the DC power supply input section, to the first capacitor and the second capacitor, and a switching control device that controls ON/OFF switching of the respective switches in the switching device in accordance with an operation mode.

27 Claims, 21 Drawing Sheets

EQUIVALENT AT TIME OF DOUBLE STEP-UP OPERATION

FIG.4A STEP-UP OPERATION TIME (2 X VOLTAGE)
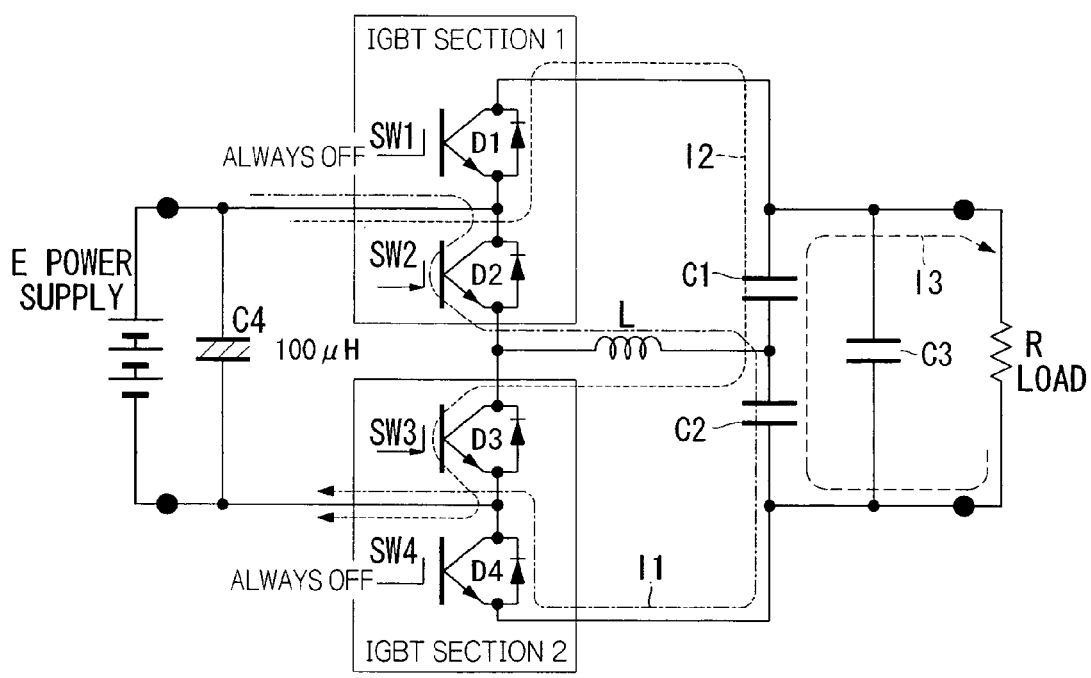
FIG.4B
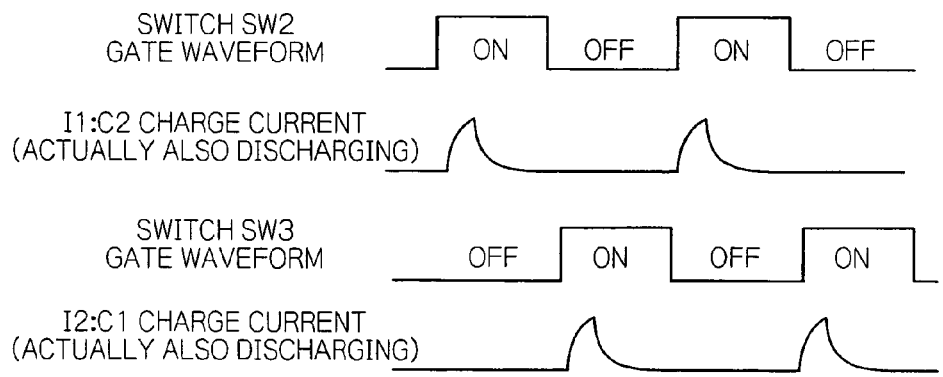

REGENERATION OPERATION TIME (1/2 × REGENERATION)

V1<V2

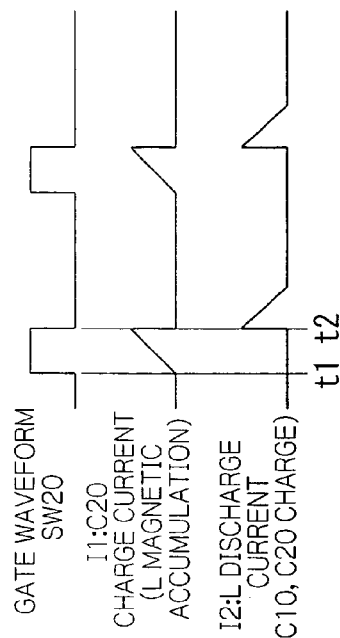
FIG.15B
GATE WAVEFORM SW20
I1:C20 CHARGE CURRENT (L MAGNETIC ACCUMULATION)
I2:L DISCHARGE CURRENT (C10, C20 CHARGE)
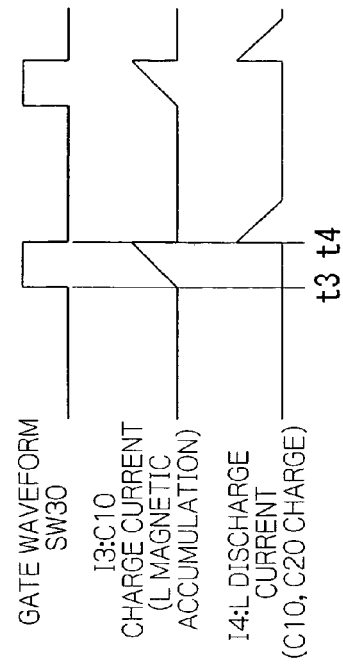
FIG.15D
GATE WAVEFORM SW30
I3:C10 CHARGE CURRENT (L MAGNETIC ACCUMULATION)
I4:L DISCHARGE CURRENT (C10, C20 CHARGE)
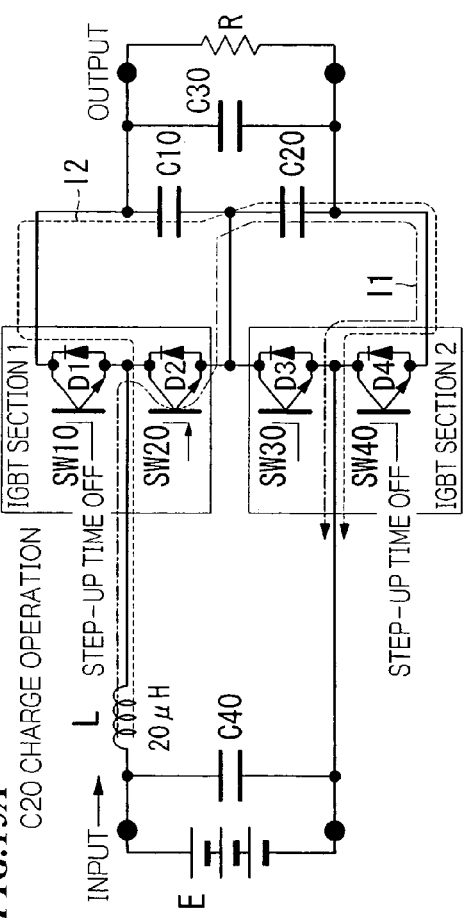
FIG.15A C20 CHARGE OPERATION
⇅ UP/DOWN CONDITION GENERATED ALTERNATELY
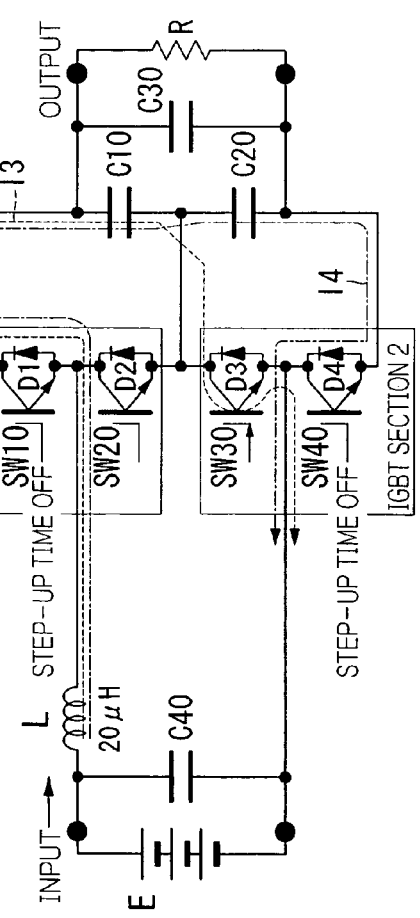
FIG.15C C10 CHARGE OPERATION

V1<V2

DC/DC CONVERTER HAVING TRANSISTOR SWITCHES WITH FLYWHEEL DIODES AND PROGRAM FOR CONTROLLING THE TRANSISTOR SWITCHES

Priority is claimed to Japanese application No. 2004-031311, filed Feb. 6, 2004 and Japanese application No. 2004-031324, filed Feb. 6, 2004, which are incorporated herein by reference.

FIELD OF THE INVENTION

The present invention relates to a DC/DC converter, and in particular relates to a DC/DC converter that can step-up and down direct current voltage at an optional multiplication, and to a program.

DESCRIPTION OF THE RELATED ART

A DC/DC converter that converts DC (direct current) voltage is used for various types of equipment. For example, it is used in a power generating device that uses a solar cell, a wind power generating device, a fuel cell system, a hybrid automobile and so forth. Especially in the case where a DC/DC converter is applied to technological areas having strict restrictions in terms of space and weight, such as an automobile, there is an extremely strong demand for miniaturization and lightening of the DC/DC converter.

FIG. 7 shows a circuit structure diagram of a conventional well known voltage step-up DC/DC converter. In the circuit shown in FIG. 7, a switch SW is alternately turned ON and OFF. When the switch SW is turned ON, magnetic energy is accumulated in an inductor L, and when the switch SW is turned OFF, the magnetic energy accumulated in the inductor L is supplied as electric power to the output side. At this time, since the output from the inductor L is added to the power supply voltage, a voltage that is as a whole stepped up, can be obtained in the output section.

However, in a step-up method like this, in order to carry out sufficient step-up while preventing magnetic saturation of the inductor L, an inductor L that uses a heavy and large core is needed. This becomes an inhibiting factor against miniaturization and lightening of the whole DC/DC converter.

Accordingly, for equipment that strongly requires miniaturization and lightening, such as a mobile phone, a charge pump circuit that uses a capacitor known as a flying capacitor has been proposed as a voltage conversion method (for example, Japanese Patent Application, First Application No. 2003-61339). Moreover, conventionally, a stabilized power supply circuit that uses a switched capacitance method has also been proposed (for example, Japanese Patent Application, First Publication No. 2003-111388).

In these methods, the flying capacitor is generally used for transmitting and receiving electric power. FIGS. 8A and 8B are diagrams showing a conventional example of a DC/DC converter that uses a flying capacitor, and the operation status thereof. By alternately switching the switches SW11 and SW12, the statuses shown in FIG. 8A and FIG. 8B are alternately repeated.

Specifically, in the status shown in FIG. 8A: switches SW11→ON, SW14→ON, SW12→OFF, and SW13→OFF; and in the status shown in FIG. 8B: switches SW11→OFF, SW14→OFF, SW12→ON, and SW13→ON.

In the status shown in FIG. 8A, for a predetermined time the electric current I1 flows through the route of power supply E→SW11→flying capacitor C11→SW14→power supply E, and electric charge is accumulated in the flying capacitor C11. At this time, since positive electric charge has been accumulated in the flying capacitor C11 in the previous operation timing, this electric charge is discharged to the output side.

Meanwhile, in the status shown in FIG. 8B, for a predetermined time the electric current I2 flows through the route of power supply E→SW13→flying capacitor C11→SW12→output side. At this time, the electric charge accumulated in the flying capacitor C11 in the previous operation timing is discharged to the output side, and this is added to the power supply voltage E, and a stepped up voltage is obtained on the output side (approximately twice the power supply voltage). Moreover, at the same time the positive electrode of the output capacitor C12 is charged with the electric current Ic, and after this, the status again becomes the status shown in FIG. 8A.

In the DC/DC converter of the construction shown in FIGS. 8A and 8B, a voltage of two times the power supply voltage is necessary for the voltage endurance characteristics of the output capacitor C12. Moreover, in the case of obtaining an output of a desired multiple of the power supply voltage, the voltage endurance of the capacitor C12 increases to two times, three times, four times, etc. corresponding to the increase in the number of flying capacitors. The output capacitor of a high voltage endurance, needs to be one with a large capacity which can supply current while the switch SW12 is OFF. As a result this is a large type, thus leading to a large size, and high cost DC/DC converter.

Moreover, in the construction shown in FIG. 8, the current from the power supply and the flying capacitor C11, and the discharge current from the output capacitor C12 are supplied alternately to the output side. Therefore this leads to non-uniformity of the output voltage or a drop in the power conversion efficiency (attributable to the heat output due to using a high voltage endurance capacitor).

Furthermore, since a large number of switches are provided in the system shown in FIGS. 8A and 8B, it is necessary to perform highly accurate ON/OFF control operations using a control device.

SUMMARY OF THE INVENTION

The present invention is constituted by first embodiment and second embodiment. The first embodiment and the second embodiment will be summarized as follows.

FIRST EMBODIMENT

The first embodiment of the present invention has been made in order to solve the above problems. An object of the present invention is to provide a DC/DC converter that can realize a small size, light weight, high efficiency, and low cost, and a program.

A DC/DC converter of the present invention comprises a DC power supply input section, a plurality of switches, a plurality of capacitors, and an output section connected to the plurality of capacitors, and feature of the present invention is in that by making the plurality of capacitors function selectively with ON/OFF control of the plurality of switches according to an operation mode, any one of the operations among voltage step-up, conduction, and regeneration can be carried out.

According to such a construction, a plurality of switches (for example, the switches SW1 to SW4 shown in FIG. 1) are controlled to turn ON and OFF, and a plurality of capacitors (for example, the capacitors C1 and C2 shown in FIG. 1) are individually charged by the power supply voltage of the DC input section, and a stepped up voltage is obtained at the output section connected to the plurality of capacitors (voltage step-up). Furthermore, at the time of a regeneration mode, a plurality of switches (for example, the switches SW1 to SW4 shown in FIG. 1) is controlled to turn ON and OFF, and regenerative electric power accumulated in the plurality of capacitors is returned to the power supply side (regeneration). Moreover, a plurality of switches (for example, the switches SW1 to SW4 shown in FIG. 1) is controlled to turn ON and OFF, and the voltage of the DC power supply input section is directly output to the output section (conduction).

As a result, by simply changing the switching operation, the same circuit can be used for any one of a voltage step-up circuit, a conduction circuit, and a regeneration circuit.

Moreover, a feature of the DC/DC converter of the present invention comprising a plurality of switching devices that perform ON/OFF control of switches, based on a designated operation mode, and also based on a voltages of the DC power supply input section and the output section.

According to such a construction, a plurality of switches (for example, the switches SW1 to SW4 shown in FIG. 1) are controlled to turn ON and OFF according to a designated operation mode, and the voltage of the DC power supply input section and the voltage of the output section are compared, to control the plurality of switches to turn ON and OFF.

As a result, for example, in the case where the designated mode is a voltage step-up mode, when the load is a motor and the voltage of the output section suddenly rises due to a regenerative braking operation, this is detected and the plurality of switches (for example, the switches SW1 to SW4 shown in FIG. 1) can be controlled to turn ON and OFF so as to operate the regeneration function.

Moreover, the DC/DC converter of the present invention has a feature that the DC/DC converter comprises a DC power supply input section; a first and second capacitor connected in series; and an output section connected to the first and second capacitors, a first switch that connects a positive electrode side of the DC power supply input section to a positive electrode side of the first capacitor and a positive electrode side of the output section; a second switch that connects the positive electrode side of the DC power supply input section to a negative electrode side of the first capacitor and a positive electrode side of the second capacitor; a third switch that connects a negative electrode side of the power supply input section to the negative electrode side of the first capacitor and the positive electrode side of the second capacitor; and a fourth switch that connects the negative electrode side of the power supply input section to the negative electrode side of the second capacitor and the negative electrode side of the output section, and the first to fourth switches are respectively turned ON and OFF according to an operation mode, and any one of the operations of: voltage step-up, conduction, and regeneration is performed by making the first and second capacitors to function selectively.

According to such a construction, the first to the fourth switches (for example, the switches SW1 to SW4 shown in FIG. 1) are controlled to turn ON and OFF, the first capacitor (for example, the capacitor C1 shown in FIG. 1) and the second capacitor (for example, the capacitor C2 shown in FIG. 1) are alternately charged with the power supply voltage of the DC power supply input section, and a stepped up voltage is output from the output section (voltage step-up). Moreover, the first to the fourth switches are controlled to turn ON and OFF, and the regenerative electric power accumulated in the first capacitor and the second capacitor is returned to the power supply side (regeneration). Furthermore the first switch and the fourth switch are turned ON, and the second switch and the third switch are turned OFF, and the power supply voltage of the DC power supply input section is directly output to the output section (conduction).

As a result, by simply changing the switching operation, the same circuit can be used for any one of; a voltage step-up circuit, a conduction circuit, and a regeneration circuit.

Furthermore, the DC/DC converter of the present invention is characterized in that it is further provided with a switching device that performs ON/OFF control of the first to fourth of switches, based on a designated operation mode, and the voltages of the DC power supply input section and the output section.

According to such a construction, the first to fourth switches (for example, the switches SW1 to SW4 shown in FIG. 1) are controlled to turn ON and OFF according to a designated operation mode, and the voltage of the DC power supply input section and the voltage of the output section are compared, to control the plurality of switches to turn ON and OFF.

As a result, for example, in the case where the designated mode is a voltage step-up mode, when the load is a motor (including alternating current motors and brush motors) and the voltage of the output section suddenly rises due to a regenerative braking operation, this is detected and the first to fourth switches can be controlled to turn ON and OFF so as to operate the regeneration function.

Moreover, the DC/DC converter of the present invention is characterized in that the first to fourth switches are transistor switches equipped with flywheel diodes.

According to such a construction, for the respective operation modes of voltage step-up, regeneration and conduction, in the case where the first to the fourth switches (for example, the switches SW1 to SW4 shown in FIG. 1) are controlled to turn ON and OFF, the electric current flows in only one direction for any switch. Moreover in the case where the direction of the electric current is the forward direction of the flywheel diode, ON/OFF control for this transistor switch is not performed, and the switching operation (rectification) of the flywheel diode is utilized.

As a result, the number of the switches to be controlled to turn ON and OFF can be reduced, and the switching control can be simplified.

Moreover, the DC/DC converter of the present invention is characterized in that the transistor switches are IGBTs.

As a result, high speed, large current, and high voltage switching control can be achieved.

Moreover, the first and second capacitors of the DC/DC converter of the present invention are film capacitors.

As a result, the advantages of a film capacitor, such as its charge accumulation efficiency (approximately 80% for an electrolytic capacitor, and approximately 98% for a film capacitor), small size, light weight, and low price can be utilized, and high efficiency, miniaturization, and price reduction of the DC/DC converter can be realized.

Furthermore, the first and second capacitors of the DC/DC converter of the present invention are ceramic capacitors.

As a result, charging efficiency is maintained on the same level as for when a film capacitor is used, while further miniaturization can be achieved.

Moreover, the DC/DC converter of the present invention is characterized in that; at the time of a voltage step-up mode, by alternately turning the second and the third switches ON and OFF while the first and the fourth switches are always turned OFF, when the second switch is ON, the second switch and a flywheel diode of the fourth switch are electrically conducted, and when the third switch is ON, a flywheel diode of the first switch, and the third switch are connected, and at the time of a conduction mode, the first to fourth switches are always turned OFF, and the flywheel diodes of the first and fourth switches are electrically conducted, and at the time of a regeneration mode, the second and third switches are always turned OFF, and by alternately turning the first and fourth switches ON and OFF, when the first switch is ON, the first switch and the flywheel diode of the third switch are electrically conducted, and when the fourth switch is ON, the flywheel diode of the second switch, and the fourth switch are electrically conducted.

According to such a construction, at the time of a step-up mode, by keeping the first and fourth switches (for example, the switches SW1 and SW4 shown in FIG. 4) always OFF, while alternately turning the second and third switches (for example, the switches SW2 and SW3 shown in FIG. 4) ON and OFF, when the second switch is ON the second switch and the flywheel diode of the fourth switch (for example, the flywheel diode D4 shown in FIG. 4) are electrically conducted, and the second capacitor (for example, the capacitor C2 shown in FIG. 4) is charged. Moreover, when the third switch is ON the flywheel diode (for example, the flywheel diode D1 shown in FIG. 1) of the first switch, and the third switch are electrically conducted, and the first capacitor (for example, the capacitor C1 shown in FIG. 4) is charged.

Furthermore, at the time of the conduction mode, the first to fourth switches (for example, the switches SW1 to SW2 shown in FIG. 5) are always turned OFF, the flywheel diodes (for example, the flywheel diodes D1 and D4 shown in FIG. 5) of the first and fourth switches are electrically conducted, and the voltage of the DC power supply input section is directly output to the output section.

Moreover, at the time of the regeneration mode, by keeping the second switch (for example, SW2 shown in FIG. 6) and the third switch (for example, SW3 shown in FIG. 6) always OFF, while alternately turning the first switch (for example, SW1 shown in FIG. 6) and the fourth switch (for example, SW4 shown in FIG. 6) ON and OFF, when the first switch is ON, the first switch and the flywheel diode of the third switch (for example, the flywheel diode D3 shown in FIG. 6) are electrically conducted, and the regenerative electric power accumulated in the first capacitor (for example, the capacitor C1 shown in FIG. 6) is returned to the DC power supply side. Furthermore, when the fourth switch is ON, the flywheel diode of the second switch (for example, the flywheel diode D2 shown in FIG. 6), and the fourth switch are electrically conducted, and the regenerative electric power accumulated in the second capacitor (for example, the capacitor C2 shown in FIG. 6) is returned to the DC power supply side.

As a result, by simply changing the operation of switches, the same circuit can be used for any one of; a voltage step-up circuit, a conduction circuit, and a regeneration circuit.

Moreover, the DC/DC converter of the present invention is characterized in that it is further provided with a regeneration blocking mode that blocks a regeneration operation with the first and fourth switches always turned OFF.

As a result, a regeneration blocking mode can be realized in the case where unwanted regeneration needs to be blocked.

Furthermore, a computer program of the present invention is a program for executing on a computer, control of a plurality of switches in a DC/DC converter provided with: a DC power supply input section; a plurality of switches; a plurality of capacitors; and an output section connected to the plurality of capacitors, and is characterized in that processing for controlling the plurality of switches to turn ON and OFF according to any one of the operation modes of: voltage step-up, conduction, and regeneration, and making the plurality of capacitors function selectively, is executed on a computer.

Moreover, the computer program of the present invention is executed on a computer, processing for ON/OFF control of the plurality of switches, based on a designated operation mode, and the voltage of the DC power supply input section detected by an input voltage detection section, and of the output section detected by an output voltage detection section.

Furthermore, the computer program of the present invention is a program for executing on a computer, control of first to fourth switches in a DC/DC converter that is provided with: a DC power supply input section; a first switch that connects a positive electrode side of the DC power supply input section to a positive electrode side of a first capacitor, and a positive electrode side of an output section; a second switch that connects the positive electrode side of the DC power supply input section to a negative electrode side of the first capacitor and a positive electrode side of the second capacitor; a third switch that connects the negative electrode side of the DC power supply input section to the negative electrode side of the first capacitor, and the positive electrode side of the second capacitor; and a fourth switch that connects the negative electrode side of the DC power supply input section to the negative electrode side of the second capacitor, and the negative electrode side of the output section, and is characterized in that processing for controlling the first to fourth switches to turn ON and OFF according to any one of the operation modes of: voltage step-up, conduction, and regeneration, and making the plurality of capacitors function selectively, is executed on a computer.

Moreover, the computer program of the present invention is characterized in that it executes on a computer, processing for ON/OFF control of the plurality of switches, based on a designated operation mode, and the voltage of the DC power supply input section detected by an input voltage detection section, and of the output section detected by an output voltage detection section.

SECOND EMBODIMENT

The second embodiment of the present invention will be summarized below.

The second embodiment of the present invention has been made to solve the above described problems.

A DC/DC converter comprising a DC power supply input section; an inductor connected to the DC power supply input section; a plurality of switches; a plurality of capacitors; and an output section connected to the plurality of capacitors, and is characterized in that by making the inductor and the plurality of capacitors function selectively with ON/OFF control of the plurality of switches according to an operation mode, any one of the operations of; voltage step-up, conduction, and regeneration is performed.

According to such a construction, a plurality of switches (for example, the switches SW10 to SW40 shown in FIG. 10) are controlled to turn ON and OFF, and a plurality of capacitors (for example, the capacitors C10 and C20 shown in FIG. 10) are individually charged with direct current power supply through an inductor (for example, the inductor L shown in FIG. 10). Moreover magnetic energy is accumulated in the inductor (for example, the inductor L shown in FIG. 10), and the plurality of capacitors are also charged by a discharging current from this inductor, and a stepped up voltage is obtained at the output section (voltage step-up). Furthermore, at the time of a regeneration mode, a plurality of switches (for example, the switches SW10 to SW40 shown in FIG. 10) are controlled to turn ON and OFF, and regenerative electric power accumulated in the plurality of capacitors is returned to the power supply side through the inductor, and at this time, magnetic energy is accumulated in the inductor, and also due to the discharging current from the inductor, regenerative electric power is returned to the power supply side (regeneration). Moreover, a plurality of switches (for example, the switches SW10 to SW40 shown in FIG. 10) are controlled to turn ON and OFF, and the voltage of the DC power supply input section is directly output to the output section (conduction).

As a result, by simply changing the switching operation, the same circuit can be used for any one of; a voltage step-up circuit, a conduction circuit, and a regeneration circuit.

Moreover, the DC/DC converter of the second embodiment of the present invention further comprising a switching device that performs ON/OFF control of the plurality of switches, based on a designated operation mode, and a voltage of the DC power supply input section and the output section.

According to such a construction, a plurality of switches (for example, the switches SW10 to SW40 shown in FIG. 10) are controlled to turn ON and OFF according to a designated operation mode, and the voltage of the DC power supply input section and the voltage of the output section are compared, to control the plurality of switches to turn ON and OFF.

As a result, for example, in the case where the designated mode is a voltage step-up mode, the voltage of the output section can be set at an optional value. Also, when the load is a motor and the voltage of the output section suddenly rises due to a regenerative braking operation, this is detected and the plurality of switches (for example, the switches SW10 to SW40 shown in FIG. 10) can be controlled to turn ON and OFF so as to operate the regeneration function.

Moreover, the feature of the DC/DC converter that the DC/DC converter comprising a DC power supply input section, a first and second capacitor connected in series; and an output section connected to the first and second capacitors, and there is provided: an inductor connected to a positive electrode side or a negative electrode side of the DC power supply input section, a first switch that connects the positive electrode side of the DC power supply input section to a positive electrode side of the first capacitor and a positive electrode side of the output section through the inductor, a second switch that connects the positive electrode side of the DC power supply input section to a negative electrode side of the first capacitor and a positive electrode side of the second capacitor through the inductor, a third switch that connects the negative electrode side of the power supply input section to the negative electrode side of the first capacitor and the positive electrode side of the second capacitor; and a fourth switch that connects the negative electrode side of the power supply input section to the negative electrode side of the second capacitor and the negative electrode side of the output section, and the first to fourth switches are respectively turned ON and OFF according to an operation mode, and any one of the operations of: voltage step-up, conduction, and regeneration is performed by making the inductor and the first and second capacitors to function selectively.

According to such a construction, the first to the fourth switches (for example, the switches SW10 to SW40 shown in FIG. 10) are controlled to turn ON and OFF, and the first capacitor (for example, the capacitor C10 shown in FIG. 10) and the second capacitor (for example, the capacitor C20 shown in FIG. 10) are alternately charged with direct current power supply from the DC power supply input section through an inductor (for example, the inductor L shown in FIG. 10). At this time, the first capacitor and the second capacitor are alternately charged from the power supply through the inductor, and the first capacitor and the second capacitor are also charged with the discharging current of the inductor (voltage step-up).

Also, at the time of regeneration mode, the first to the fourth switches are controlled to turn ON and OFF, and the regenerative electric power accumulated in the first capacitor and the second capacitor is returned to the power supply side through the inductor. At this time, the regenerative electric power from the first capacitor and the second capacitor is alternately returned to the power supply side through the inductor, and the regenerative electric power is returned to the power supply side with the discharging current of the inductor (regeneration). Moreover, the first to the fourth switches are controlled to turn ON and OFF, and the voltage of the DC power supply input section is directly output to the output section (conduction).

As a result, by simply changing the switching operation, the same circuit can be used for any one of, a voltage step-up circuit, a conduction circuit, and a regeneration circuit. Furthermore, by controlling the first to the fourth switches (for example, the switches SW10 to SW40 shown in FIG. 10) to turn ON and OFF, the output voltage can be set not to a fixed multiple voltage, but to an appropriate optional intermediate value, when stepping up or down (regenerating) the voltage. Moreover, since voltage step-up is basically achieved as a result of a voltage build-up effect of the capacitors, the inductor used for electric current control may be significantly smaller (for example, 20 μH) than the conventional type (see FIG. 7). That is, miniaturization, lightening, and price reduction of the DC/DC converter can be realized. Also, at the time of a voltage step-down operation in the opposite direction, the inductor functions as an inductor of a step-down inductor, and regeneration voltage step-down in the opposite direction is also possible.

The feature of the DC/DC converter of the present embodiment is that it comprises a switching device that performs ON/OFF control of the first to fourth of switches, based on a designated operation mode, and the voltages of the DC power supply input section and the output section.

According to such a construction, the first to fourth switches (for example, the switches SW10 to SW40 shown in FIG. 10) are controlled to turn ON and OFF according to a designated operation mode, and the voltage of the DC power supply input section and the voltage of the output section are compared, to control the plurality of switches to turn ON and OFF.

As a result, for example, in the case where the designated mode is a voltage step-up mode, the voltage of the output section can be set at an optional value. Also, when the load is a motor (including alternating current motors and brush motors) and the voltage of the output section suddenly rises due to a regenerative braking operation, this is detected and the first to fourth switches (for example, the switches SW10 to SW40 shown in FIG. 10) can be controlled to turn ON and OFF so as to operate the regeneration function.

Moreover, the DC/DC converter of the present embodiment is characterized in that the first to fourth switches are transistor switches equipped with flywheel diodes.

According to such a construction, in the case where the first to the fourth switches (for example, the switches SW10 to SW40 shown in FIG. 10) are controlled to turn ON and OFF, the electric current flows in only one direction. Moreover in the case where there is a switch in which the direction of the electric current is the forward direction of the flywheel diode, ON/OFF control of the switch is not performed, and the switching operation (rectification) of the flywheel diode is utilized.

As a result, the number of the switches to be controlled to turn ON and OFF can be reduced, and the switching control can be simplified.

Moreover, the feature of the present DC/DC converter is that the transistor switches are IGBTs.

As a result, high speed, large current, and high voltage switching control can be achieved.

Moreover, the feature of the DC/DC converter of the present embodiment is that the first and second capacitors are film capacitors.

As a result, the advantages of a film capacitor, such as its high charge accumulation efficiency (approximately 80% for an electrolytic capacitor, and approximately 98% for a film capacitor), small size, light weight, and low price can be utilized, and high efficiency, miniaturization, and price reduction of the DC/DC converter can be realized.

Furthermore, the DC/DC converter of the present invention is characterized in that the first and second capacitors are ceramic capacitors.

As a result, charging efficiency is maintained on the same level as that of a film capacitor while further miniaturization can be achieved.

Moreover, the feature of the DC/DC converter of the second embodiment is that; at the time of a step-up mode, by alternately turning the second and the third switches ON and OFF while the first and the fourth switches are always turned OFF, when the second switch is ON, the second switch and a flywheel diode of the fourth switch are electrically conducted, and when the third switch is ON, a flywheel diode of the first switch, and the third switch are conducted, and at the time of a conduction mode, the first to fourth switches are always turned OFF, and the flywheel diodes of the first and fourth switches are electrically conducted, and at the time of a first regeneration mode, the second and third switches are always turned OFF, and by alternately turning the first and fourth switches ON and OFF, when the first switch is ON, the first switch and a flywheel diode of the third switch are electrically conducted, and when the fourth switch is ON, the flywheel diode of the second switch, and the fourth switch are electrically conducted, and at the time of a second regeneration mode, only the first switch is turned ON and OFF, and the second and third switches are always turned OFF, and the fourth switch is always turned ON, and when the first switch is ON, the first and fourth switches are electrically connected, and when the first switch is OFF, the flywheel diodes of the second and third switches are electrically connected.

According to such a construction, at the time of a step-up mode, by keeping the first and fourth switches (for example, the switches SW10 and SW40 shown in FIG. 15A) always OFF, while alternately turning the second and third switches (for example, the switches SW20 and SW30 shown in FIG. 15A) ON and OFF, when the second switch is ON the second switch and the flywheel diode of the fourth switch (for example, the flywheel diode D4 shown in FIG. 6) are electrically conducted, and the second capacitor (for example, the capacitor C20 shown in FIG. 15A) is charged. Moreover, when the third switch is ON the flywheel diode (for example, the flywheel diode D1 shown in FIG. 1) of the first switch, and the third switch are electrically connected, and the first capacitor (for example, the capacitor C10 shown in FIG. 15A) is charged.

Furthermore, at the time of the conduction mode, the first to fourth switches (for example, the switches SW10 to SW20 shown in FIG. 16A) are always turned OFF, the flywheel diodes of the first and fourth switches are electrically conducted, and the voltage of the DC power supply input section is directly output to the output section.

Moreover, at the time of the first regeneration mode, by keeping the second switch (for example, SW20 shown in FIG. 17A) and the third switch SW30 (for example, SW30 shown in FIG. 17A) always OFF, while alternately turning the first switch (for example, SW1 shown in FIG. 17A) and the fourth switch (for example, SW40 shown in FIG. 17A) ON and OFF, when the first switch is ON, the first switch and the flywheel diode of the third switch (for example, the flywheel diode D30 shown in FIG. 17A) are electrically conducted, and the regenerative electric power accumulated in the first capacitor (for example, the capacitor C10 shown in FIG. 17A) is returned to the DC power supply side.

Furthermore, when the fourth switch is ON, the flywheel diode of the second switch (for example, the flywheel diode D20 shown in FIG. 17A), and the fourth switch are electrically connected, and the regenerative electric power accumulated in the second capacitor (for example, the capacitor C20 shown in FIG. 17A) is returned to the DC power supply side.

Moreover, at the time of the second regeneration mode, the first switch (for example, SW10 shown in FIG. 18A) only is turned ON and OFF, and the second switch (for example, SW20 shown in FIG. 18A) and the third switch (for example SW30 shown in FIG. 19A) are always turned OFF, and the fourth switch (for example, SW40 in FIG. 18A) is always turned ON, and when the first switch is ON, the first switch and the fourth switch are electrically connected, and the regenerative electric power accumulated in the first capacitor (for example, the capacitor C10 shown in FIG. 18A) and the second capacitor (for example, the capacitor C20 shown in FIG. 18A) is returned to the DC power supply side. Furthermore, when the first switch is OFF, the flywheel diodes of the second and third switches (for example, the flywheel diodes D20 and D30 shown in FIG. 18A) are electrically connected, and magnetic energy accumulated in the inductor (for example, the inductor L shown in FIG. 18A) is returned to the power supply side.

As a result, by simply changing the operation of switches, the same circuit can be used for any one of a voltage step-up circuit, a conduction circuit, and a regeneration circuit. Furthermore, the output voltage can be set not to a fixed multiple voltage, but to an appropriate optional intermediate value, when stepping up or down (regenerating) the voltage. Moreover, since voltage step-up is basically achieved as a result of a voltage build-up effect of the capacitors, the inductor used for electric current control may be significantly smaller (for example, 20 µH) than the conventional type (see FIG. 20. That is to say, miniaturization, lightening, and price reduction of the DC/DC converter can be realized. Furthermore, at the time of a voltage step-down operation in the opposite direction, the inductor functions as an inductor of a step-down transformer, and regeneration voltage step-down in the opposite direction is also possible.

Moreover, the feature of the DC/DC converter of the present invention is that it is further provided with a regeneration blocking mode that blocks a regeneration operation with the first and fourth switches always turned OFF.

As a result, a regeneration blocking mode can be realized in the case where unwanted regeneration needs to be blocked.

Furthermore, a computer program of the present invention is a program for executing on a computer, control of a plurality of switches in a DC/DC converter provided with: a DC power supply input section; an inductor connected to the DC power supply input section; a plurality of switches; a plurality of capacitors; and an output section connected to the plurality of capacitors, and the computer carries out processing for controlling the plurality of switches to turn ON and OFF according to any one of the operation modes of: voltage step-up, conduction, and regeneration, and making the inductor and the plurality of capacitors function selectively.

Moreover, the computer program of the present invention is characterized in that it executes on a computer, processing for ON/OFF control of the plurality of switches, based on a designated operation mode, and the voltage of the DC power supply input section detected by an input voltage detection section, and of the output section detected by an output voltage detection section.

Furthermore, the computer program of the present invention is a program for executing on a computer, control of first to fourth switches in a DC/DC converter that is provided with: an inductor connected to a positive electrode side of a DC power supply input section; a first switch that connects the positive electrode side of the DC power supply input section to a positive electrode side of a first capacitor, and a positive electrode side of an output section through the inductor; a second switch that connects the positive electrode side of the DC power supply input section to a negative electrode side of the first capacitor and a positive electrode side of the second capacitor through the inductor; a third switch that connects the negative electrode side of the DC power supply input section to the negative electrode side of the first capacitor, and the positive electrode side of the second capacitor; and a fourth switch that connects the negative electrode side of the DC power supply input section to the negative electrode side of the second capacitor, and the negative electrode side of the output section, and the computer carries out processing for controlling the first to fourth switches to turn ON and OFF according to any one of the operation modes of: voltage step-up, conduction, and regeneration; and making the inductor and the plurality of capacitors function selectively.

Moreover, the computer program of the present invention is characterized in that it executes on a computer, processing for ON/OFF control of the plurality of switches, based on a designated operation mode, and the voltage of the DC power supply input section detected by an input voltage detection section, and of the output section detected by an output voltage detection section.

BRIEF DESCRIPTION OF THE DRAWING

FIGS. 4A and 4B are diagrams for explaining operation at the time of a two times voltage step-up mode.

FIGS. 15A to 15D are diagrams showing an example of a voltage step-up operation.

DETAILED DESCRIPTION OF THE INVENTION

First Embodiment

A detailed description of the first embodiment of the present invention is provided as follows with reference to FIG. 1 to FIG. 9.

Figure 1:
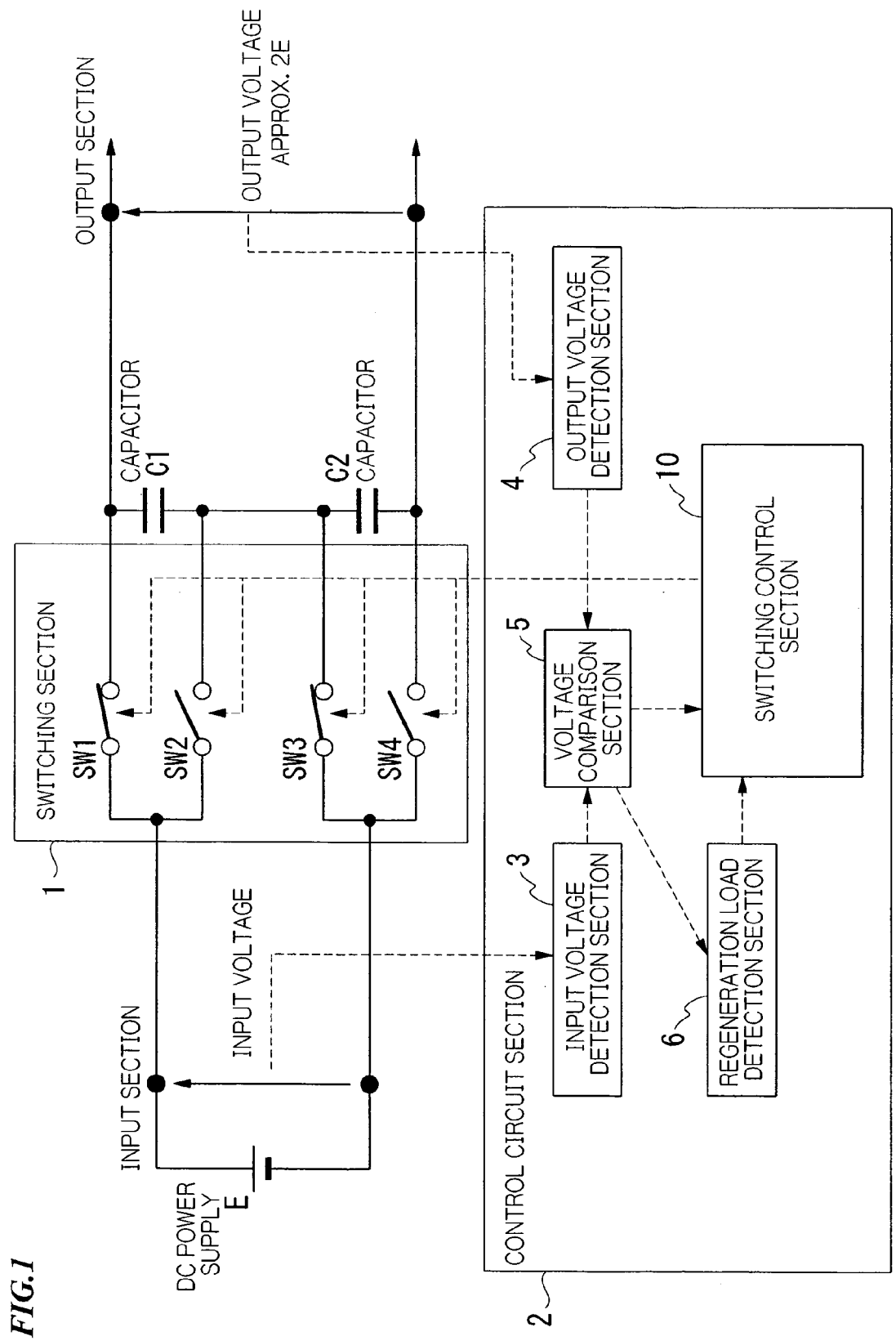
FIG. 1 is a diagram showing a fundamental construction example of a DC/DC converter according to the present invention.

FIG. 1 is a diagram showing a fundamental construction example of a DC/DC converter according to the present embodiment. The DC/DC converter of the present embodiment has; a two times voltage step-up function (for example, voltage is stepped up to approximately two times the power supply voltage of the DC power supply input section), a one times voltage step-up function (for example the power supply voltage is output directly), and a voltage step-down function (power supply regeneration).

The DC/DC converter shown in FIG. 1 is provided with: a power supply E; a switching section 1 having a first switch SW1, a second switch SW2, a third switch SW3, and a fourth SW4; a first capacitor C1; a second capacitor C2; and an output section. The first capacitor C1 and the second capacitor C2 are connected in series. Film capacitors or the like are preferably used.

Moreover, the control circuit section 2 has a function that ON/OFF controls the first switch SW1, the second switch SW2, the third switch SW3, and the fourth SW4 inside the switching section 1. Furthermore, an input voltage detection section 3 in the control circuit section 2 has a function that detects the input voltage supplied from the power supply voltage E. An output voltage detection section 4 has a function that detects the output voltage of the output section. A voltage comparison section 5 has a function that compares the power supply voltage detected by the input voltage detection section 3 with the output voltage detected by the output voltage detection section 4.

Moreover, a regeneration load detection section 6 determines whether or not a regeneration load (the load in the situation where a motor or the like is generating electricity during regenerative braking) is connected, based on the result of a comparison between the power supply voltage and the output voltage in the voltage comparison section 5, for example, in the case where "output voltage>2×power supply voltage E" at the time of a two times step-up operation. Furthermore, a switching control section 10 is a device for performing ON/OFF control of the first switch SW1, the second switch SW2, the third switch SW3, and the fourth SW4. Also, the switching control section 10 has a function that controls the ON/OFF time (duty ratio) of the switches SW1 to SW4 in the switching section 1.

The voltage comparison section 5 and the switching control section 10 in this control circuit section 2 may be realized with dedicated hardware, or the same function may be realized by providing a computer system, such as a memory and a CPU in the control circuit section 2, and loading a program (not shown in the figures) for realizing the function of the voltage comparison section 5 and the switching control section 10, into the memory and executing the program.

In the DC/DC converter shown in FIG. 1, by performing ON/OFF control of the first switch SW1, the second switch SW2, the third switch SW3 and the fourth switch SW4, three types of operation mode can be optionally realized, namely: a two times voltage step-up mode; a one times voltage step-up mode; and a voltage step-down mode (power supply regeneration). The selection of the operation mode is determined by an application or the like. In the case where the present invention is employed for an electric vehicle, for example, the two times voltage step-up mode is used at the time of high speed running, and the one times voltage step-up mode is used at the time of low speed running.

At first is a description of the two times voltage step-up mode, being the most basic of the modes. The two times voltage step-up mode is one which outputs a voltage approximately two times the power supply voltage E (a voltage of approximately 2 E).

Figure 2A:
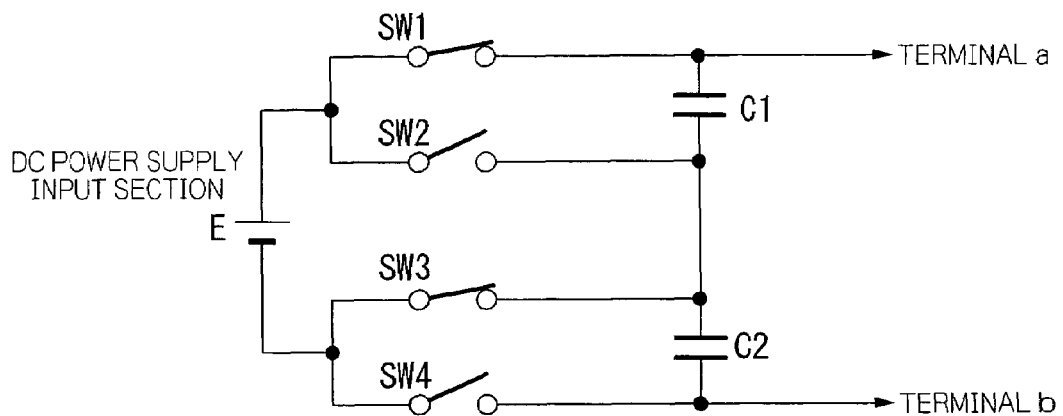
FIGS. 2A and 2B are diagrams for explaining a principle of two-times voltage step-up.
Figure 2A:
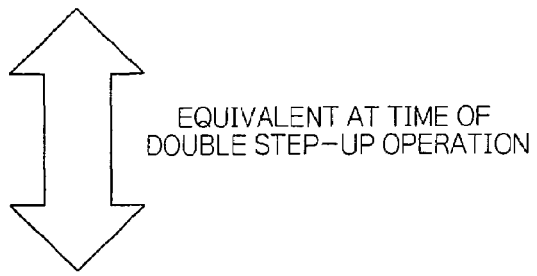
Figure 2B:
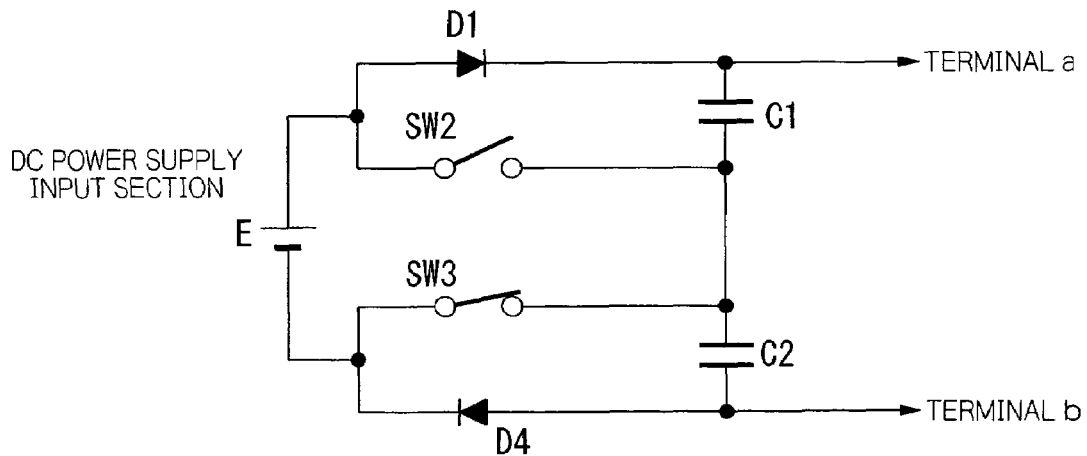

FIGS. 2A, 2B, 3A and 3B are diagrams for describing the two times voltage step-up mode. In the two times voltage step-up mode, the switching circuit shown in FIG. 2A is equivalent to that in FIG. 2B. That is to say, a switch SW1 and a switch SW2 in the circuit shown in FIG. 2A can be replaced by a diode D1 and a diode D4. The reason for this is explained using FIG. 3A.

Figure 3A:
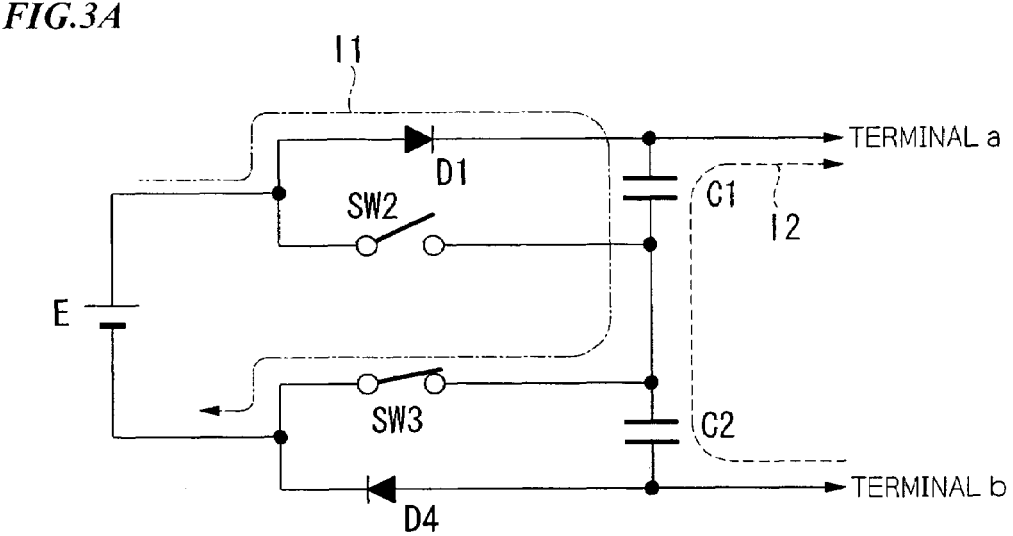
FIGS. 3A and 3B are diagram for explaining a principle of two-times voltage step-up.
Figure 3B:
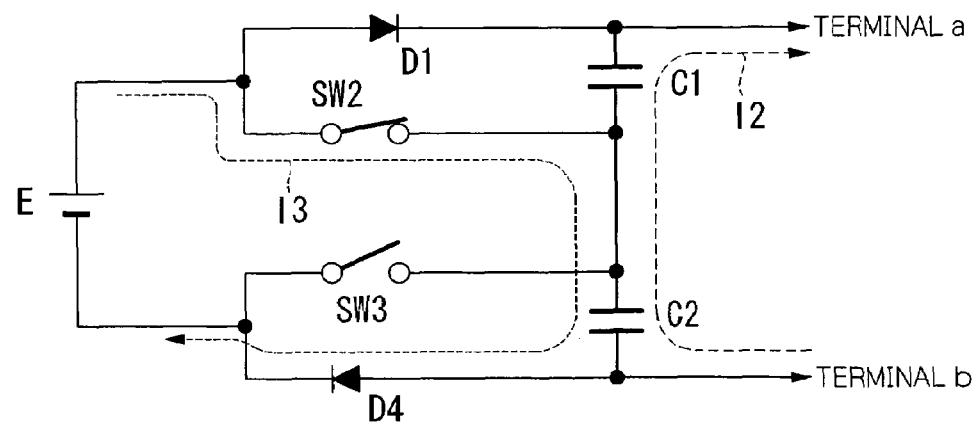

FIGS. 3A and 3B are diagrams for describing the operation of the two times voltage step-up mode. As shown in FIG. 3A, the switch SW3 is turned ON and the switch SW2 is turned OFF, a current I1 flows along the route of the power supply E→diode D1→capacitor C1→switch SW3→power supply E. At this time, the capacitor C1 is charged according to the power supply voltage E.

Next, when as shown in FIG. 3B the switch SW2 is turned ON and the switch SW3 is turned OFF, a current I3 flows along the route from power supply E→switch SW2→capacitor C2→diode D4→power supply E. At this time, the capacitor C2 is charged to the power supply voltage E. This switching control is alternately repeated. As a result, the capacitor C1 and the capacitor C2 are respectively charged to the voltage E, and since the capacitor C1 and the capacitor C2 are connected in series, a voltage output of approximately 2 E can be obtained at the output section. Moreover, a discharge current I2 is output to the output side from the capacitors C1 and C2.

In the two times voltage step-up mode shown in FIG. 3, since the direction of the current flowing in the branch (branch circuit) provided with the diode D1 (corresponding to the switch SW1 of FIG. 2A, and the diode D4 (corresponding to the switch SW4 of FIG. 2A) is only one fixed direction, this can be realized with only the switching operation (rectification) of the diodes, with the switches SW1 and SW4 always on.

In this manner, the DC/DC converter of the present invention actively uses diodes instead of switches in the case where the switching operation of a diode (the operation in which electric current flows in one direction) can be used, and contrives to reduce the number of switches to be controlled. A specific example is described in the examples section.

FIRST EXAMPLE

Next, an example of the DC/DC converter of the present invention is described. FIG. 4A is a diagram showing an example of the DC/DC converter according to the present invention. Moreover, this is a diagram for describing the operation at the time of a two times voltage step-up mode. FIG. 4B is a diagram showing the operation timing of the switches SW2 and SW3, and the waveform of the charging current to the capacitors C1 and C2.

The DC/DC converter shown in FIG. 4A has a power supply E, a smoothing capacitor (electrolytic capacitor) C4 on the input side, an IGBT section 1 and an IGBT section 2 comprising two (a pair of) IGBT devices, an inductor L and capacitors C1, C2 and C3. The capacitors C1, C2, and C3 are film capacitors in this example.

Comparing to the diagram for describing the operation of the two times voltage step-up shown in FIG. 3, the flying diode D1 of the IGBT device (SW1) on the upper side of the IGBT section 1 of FIG. 4A corresponds to the diode D1 of FIG. 3, and the IGBT device on the lower side of the IGBT section 1 corresponds to the switch SW2. Moreover, the IGBT device on the upper side of the IGBT section 2 of FIG. 4A corresponds to the switch SW3 of FIG. 3A, and the flying diode D4 of the IGBT device (SW4) on the lower side of the IGBT section 2 corresponds to the diode D4 of FIG. 3A.

In the two times voltage step-up mode of the DC/DC converter shown in FIG. 4A, the switch SW1 and the switch SW4 are always turned OFF, and as shown in FIG. 4B, a gate voltage is applied from the switching control section 10 so that the switch SW2 of the IGBT section 1, and the switch SW3 of the IGBT section 2 are alternately turned ON and OFF. In the two times voltage step-up mode, for the switch SW1 of the IGBT section 1, and the switch SW4 of the IGBT section 2, only the flywheel diodes D1 and D4 are made to function.

In FIG. 4A, when the SW2 is ON and the SW3 is OFF, the current I1 flows through the route from power supply E→switch SW2→inductor L→capacitor C2→flywheel diode D4→power supply E. At this time, the C2 is charged by the power supply E. The waveform of I1 (charge current of C2) is shown in FIG. 4B. Actually, the current I1 at this time not only charges the capacitor C2, but also a discharge current flows to the load R.

That is, since at the same time, the capacitors C1 and C2 are also connected to the capacitor C3 and the load R, the capacitor C3 is charged, and a current I3 flows to the load R as an output current.

On the other hand, when the SW2 is OFF and the SW3 is ON, the current I2 flows through the route from power supply E→flywheel diode D1→capacitor C1→inductor L→switch SW3→power supply E. At this time, the C1 is charged by the power supply E. Moreover, since at the same time, the capacitors C 1 and C2 are also connected to the output side, the capacitor C3 is charged, and a current I3 flows to the load R as an output current.

Figure 7:
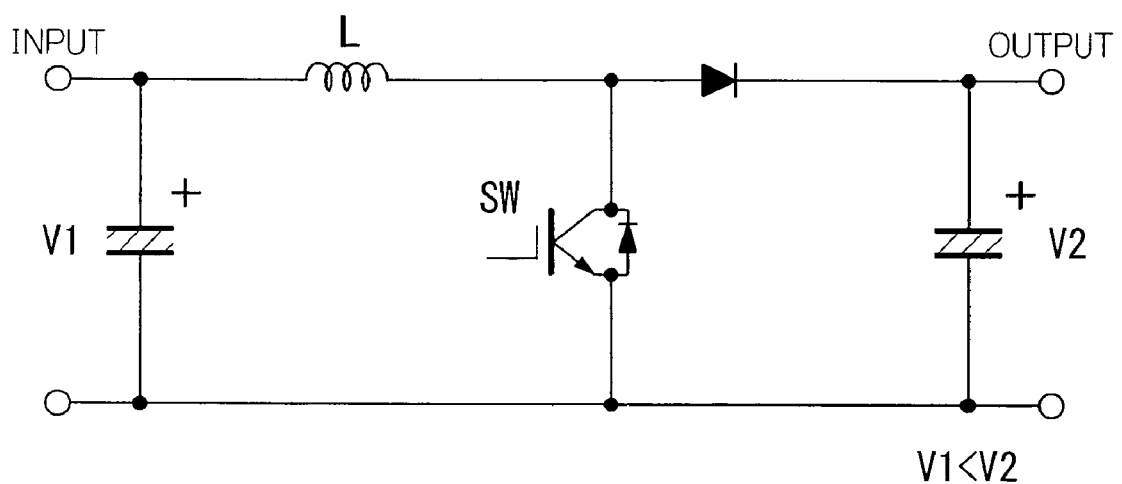
FIG. 7 is diagram showing an example of a conventional voltage step-up DC/DC converter.
Figure 8A:
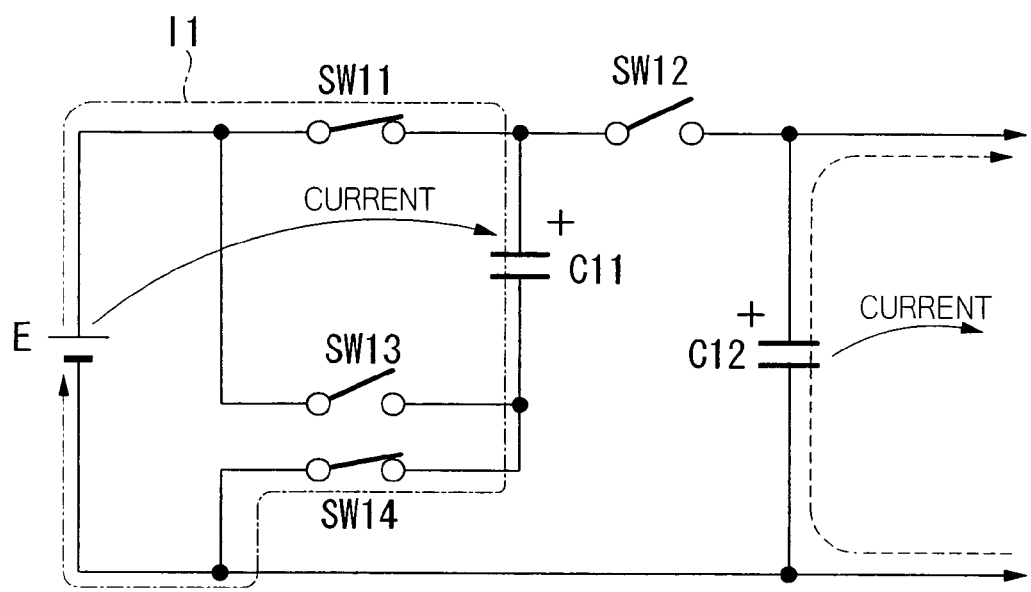
FIGS. 8A and 8B are diagrams showing examples of a conventional DC/DC converter that uses flying capacitors.
Figure 8B:
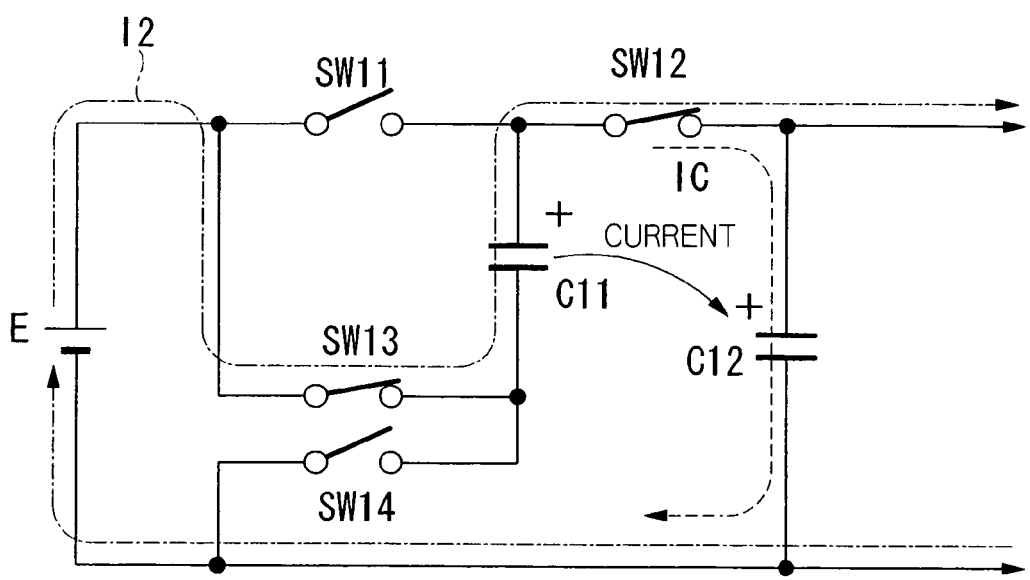

The inductor L is for suppressing the inrush current to the IGBT sections 1 and 2, and the capacitors C1 and C2 at the time of switching ON. An inductor with a capacity of less than ⅒ of the inductor L of the conventional circuit shown in FIG. 7 is sufficient (although the capacity depends on the time constant, an example is 4 µH to 10 µH for a switching frequency of 10 kHz). Consequently, this is used for accumulating the magnetic energy, and has a different objective to the conventional large size inductor L shown in FIG. 7. That is to say, the inductor L is not an essential component of the present invention.

The capacitor C3 is provided for smoothing the ripple in the output voltage, and is not an essential component of the present invention. Furthermore, an electrolytic capacitor C4 of 100 µF on the input side is provided to lower the impedance of the power supply (for example, in the case where the power supply is far from the circuit, and the power supply wiring is long, the power supply impedance is likely to increase and a control malfunction may occur, the electrolytic capacitor C4 is provided to prevent this). Accordingly, the electrolytic capacitor C4 is not an essential component of the present invention.

The switches SW2 and SW3 are alternately turned ON and OFF (the idealistic duty ratio is 50%). Since an actual switch is not ideal, and takes a finite delay time to turn ON and OFF, the actual upper limit becomes for example a duty ratio of around 45%. This duty ratio may be set so that the circuit has the most efficient voltage step-up operation, according to the characteristics of the switches SW1 and SW2, and the capacitors C1 and C2.

In the DC/DC converter of the present invention, irrespective of size of the load impedance/resistance, two times voltage step-up can be performed accompanying a slight voltage drop, with the duty ratio fixed. However this duty ratio can also be controlled using the control circuit section 2 shown in FIG. 1.

That is, the voltage E of the DC power supply input section is detected by the input voltage detection section 3, the voltage of the output section is detected by the output voltage detection section 4, and the input voltage value detected by the input voltage detection section 3, and the output voltage value detected by the output voltage detection section 4 are compared by the voltage comparison section 5. Then, based on the comparison result, duty control of the ON/OFF time for the switch SW2 and the switch SW3 is performed by means of the switching control section 10. For example, if according to the characteristics of the switches SW1 and SW2, and the capacitors C1 and C2, the duty ratio for the circuit to have the most efficient voltage step-up operation is 45%, then control is performed so as to approach this value.

In the DC/DC converter of the present invention, since the output voltage is divided between two capacitors, it is not necessary to use capacitors that handle high voltage on the output side, so that sufficient performance can be realized with a light weight and low cost film capacitor. As a result, the heat output in the capacitor is decreased, and highly efficient voltage conversion is achieved.

Figure 5A:
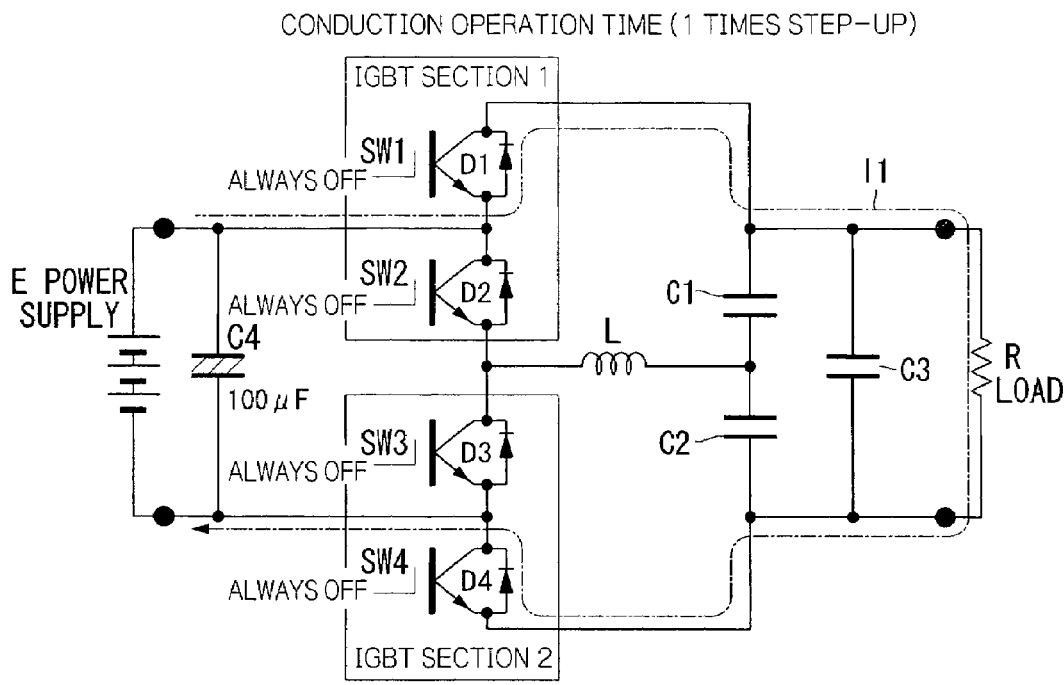
FIGS. 5A and 5B are diagrams showing an example when operating as a normal rectification circuit.

The DC/DC converter of the present invention can function not only as a voltage step-up circuit but also as a normal rectification circuit (one times voltage step-up circuit). FIG. 5A shows an example of the case where the switch SW1, the switch SW2, the switch SW3 and the switch SW4 always turned OFF, and it is operated as a normal rectification circuit (one times voltage step-up mode).

When switching of the switches SW1 to SW4 is stopped, the electric current I1 flows directly to the load R from the power supply E through the flywheel diode D1 of the IGBT section 1, and the flywheel diode D4 of the IGBT section 2. That is to say, the current I1 flows along the route: power supply E→flywheel diode D1 of the IGBT section 1→load R→flywheel diode D4 of the IGBT section 2→power supply E. At this time, the capacitors C1 and C2 do not specially contribute to voltage step-up, and the output voltage is approximately one times the input voltage.

Moreover, the DC/DC converter of the present invention has a voltage step-down (power supply regeneration) function (voltage step-down mode). For example, in the case where a motor is used as a load on the output side, and the revolution speed is controlled to decrease (regenerative braking operation etc.), and the voltage on the output (load) side increases, then so that the voltage on the output (load) side is stepped down until the output (load) side becomes two times the voltage of the input (power supply side) (the energy is returned to the input side), the power supply such as a battery on the input side, can be charged.

Figure 6A:
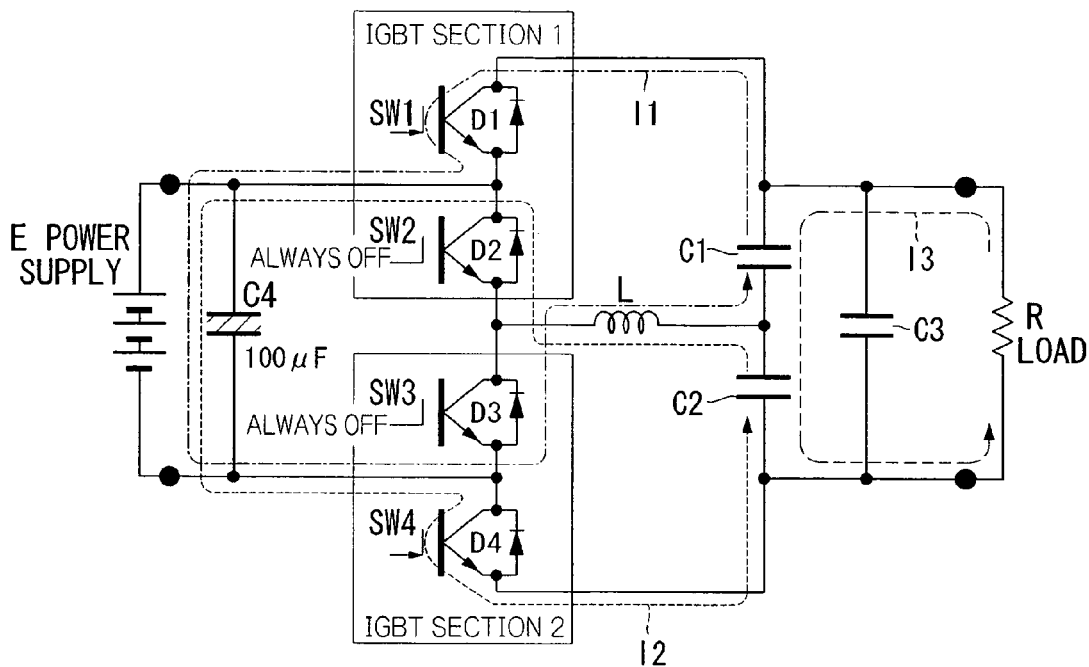
FIGS. 6A and 6B are diagrams for explaining a power supply regeneration operation.
Figure 6B:
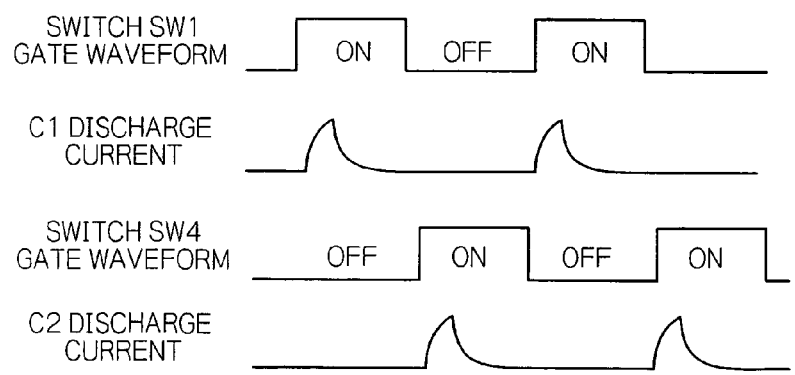

FIG. 6A is a diagram for describing the power supply regeneration operation. For example, in the case where "output voltage>2×power supply voltage" at the time of two times step-up, this operation mode can be used. In the power supply regeneration mode, the switch SW2 of the IGBT section 1 and the switch SW3 of the IGBT section 2 are always turned OFF, and a gate voltage is applied so that the switch SW1 of the IGBT section 1 and the switch SW4 of the IGBT section 2 are alternately turned ON and OFF (see FIG. 6B).

When the switch SW1 is turned ON and the switch SW4 is turned OFF, the charging current I1 flows along the route from capacitor C1→switch SW1→power supply E→flywheel diode D3→inductor L→capacitor C1. At this time, the power supply E is charged by the capacitor C1.

Moreover, when the switch SW1 is turned OFF and the switch SW4 is turned ON, the charging current I2 flows along the route: capacitor C2→inductor L→flywheel diode D2→power supply E→switch SW4→capacitor C2. At this time, the power supply E is charged by the capacitor C2.

In this manner, by alternately discharging the capacitors C1 and c2, it is possible to transfer surplus power to the input side, up until this becomes a voltage of approximately ½ of the output side voltage. Moreover, even if the voltage of the output side is increased and the electric power returning in the opposite direction (=output side→input side) becomes large, by simply increasing the current waveform it is possible to operate continually at the same duty ratio.

Figure 9:
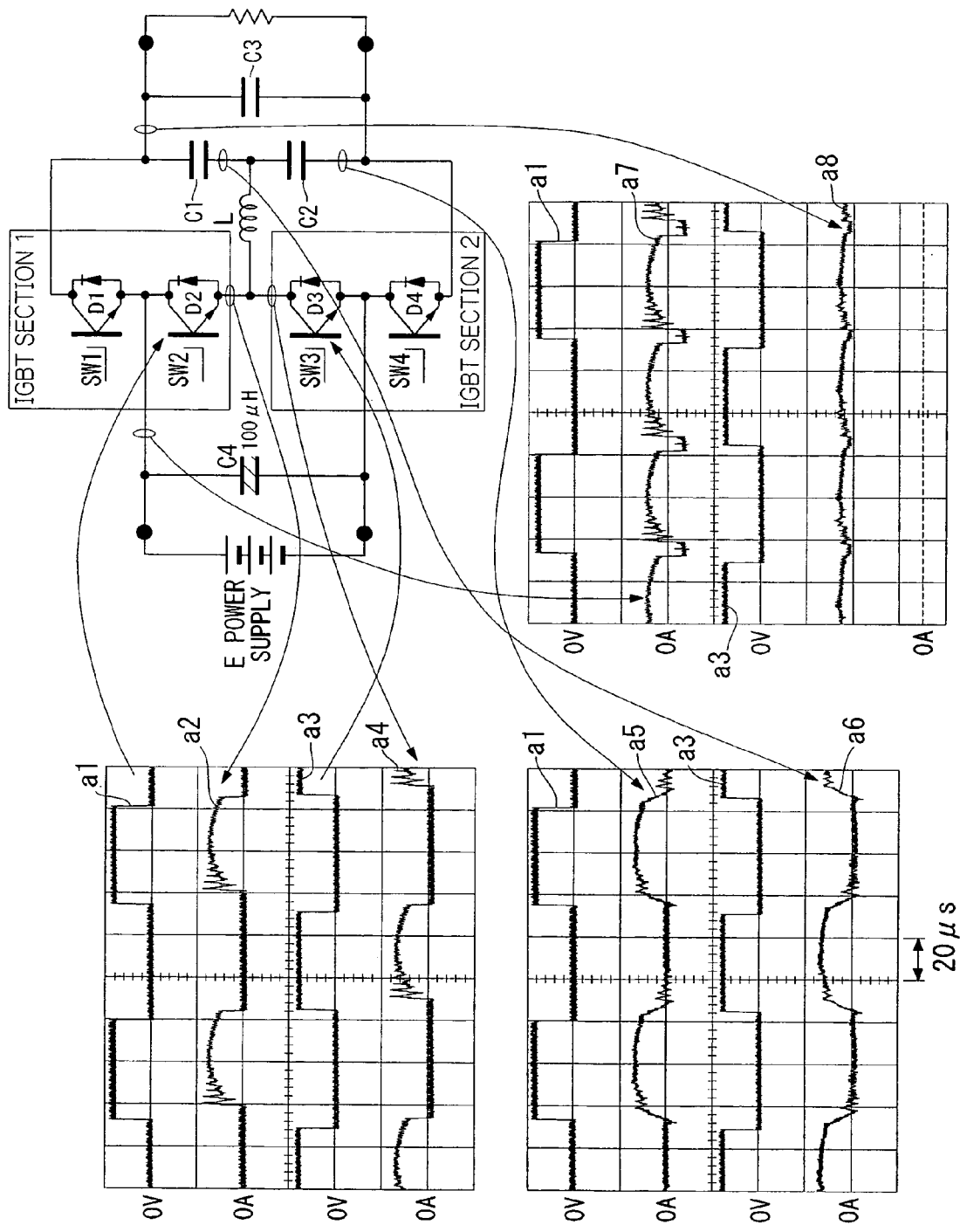
FIG. 9 is a diagram showing waveform measurement examples of each part of an actual circuit.

FIG. 9 is a diagram showing a waveform measurement example of each part of an actual circuit that uses the present invention, showing the waveforms for when the input voltage is 199.8V, the output voltage is 393.3V, and the output is 5.75 KW. These waveforms are those at the time of a two times voltage step-up mode.

In FIG. 9, reference symbol a1 denotes a waveform of the gate for turning the switch SW2 ON and OFF. Reference symbol a2 denotes a waveform of the electric current of the switch SW2. Reference symbol a3 denotes a waveform of the gate for turning the switch SW3 0N and OFF. Reference symbol a4 denotes a waveform of the electric current on the load the switch SW3. Reference symbol a5 denotes a waveform of the electric current of the capacitor C2 on the load side. Reference symbol a6 denotes a waveform of the electric current of the capacitor C1 on the load side. Reference symbol a7 denotes a waveform of the electric current flowing from the power supply E and the capacitor C4 to the IGBT section 1. Reference symbol a8 denotes a waveform of the electric current flowing to the capacitor C3 and the load side.

Figure 5B:
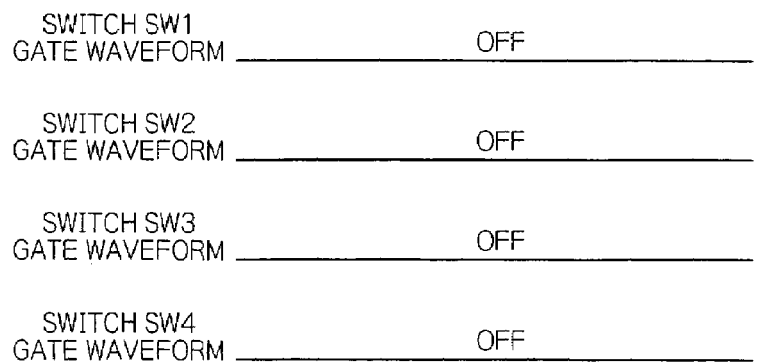

As described above, in the DC/DC converter of the present invention, if the switch SW1, the switch SW2, the switch SW3, the switch SW4, the IGBT section 1, and the IGBT section 2, are constructed from the same elements, then each of the operations described for FIG. 4, FIG. 5, and FIG. 6 can be realized by the same circuit.

According to the present invention, by forming the switch SW1 and the switch SW2 from a single IGBT section 1, and forming the switch SW3 and the switch SW4 from a single IGBT section 2, miniaturization of the circuit and simplification of the wiring is realized.

Furthermore, since the output voltage is divided between the two capacitors, capacitors that handle high voltage are no longer required, and inexpensive capacitors can be used. In the case where capacitors are used in series in a normal circuit, a bleeder resistor is required for preventing voltage deviation. However, as this is not required for the present invention, electric power conversion efficiency can be improved accordingly.

Also, the number of switches that control the switching is always two or less, so the switching control is easy. Moreover, the number of switches for switching control is always two, so that the switching control is simple. Furthermore irrespective of the size of the load, voltage step-up (including one times step-up) and regeneration is possible at the same time sequential switching duty ratio. Also, by simply changing the switches SW1 and SW2 in the switching blocking mode, the same circuit can be used for any of; a voltage step-up circuit, a conduction circuit, and a regeneration circuit.

In the example the case was described in which the first and second capacitors are film capacitors. However another type of capacitor such as a ceramic capacitor may be used. In the case where a ceramic capacitor is used, further miniaturization can be achieved while maintaining the charging efficiency at the same level as that of a film capacitor. Furthermore, according to the present invention, a regeneration blocking mode can also be realized in the case where unwanted regeneration is blocked. In the regeneration blocking mode, the switches SW1 and SW4 are always turned OFF, and only respective flywheel diodes are used for functioning the blocking.

The first embodiment of the present invention has been described above. However, the DC/DC converter of the present invention is not limited to the examples shown and described above, and of course, various kinds of modifications may be made within a scope which does not depart from the gist of the present invention. For example, the principle of the present invention can be applied to a voltage step-up circuit that steps up more than three times.

Second Embodiment

Hereinafter, the second embodiment of the present invention is described in detail with reference to FIG. 10 to FIG. 19.

Figure 10:
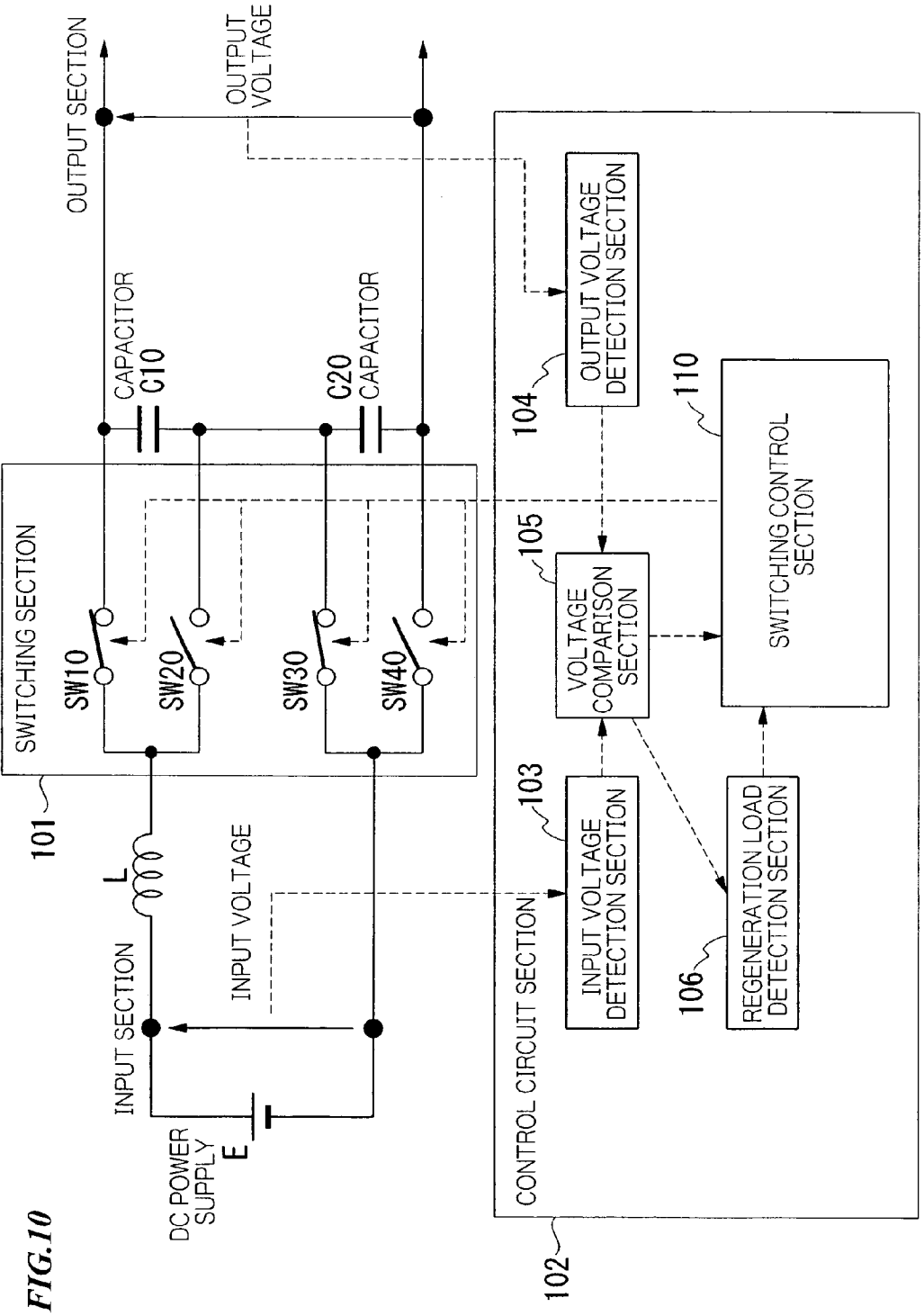
FIG. 10 is a diagram showing a fundamental construction example of a DC/DC converter according to the present invention.

FIG. 10 is a diagram showing a fundamental construction example of a DC/DC converter according to the present invention. The DC/DC converter of the present invention has a voltage step-up function (for example, voltage is stepped up to one to two times the power supply voltage of the DC power supply input section), and a power supply regeneration function.

The DC/DC converter shown in FIG. 10 is provided with: a power supply E of a DC power supply input section; an inductor L that accumulates magnetic energy; a switching section 1 having a plurality of switches SW10 to SW40; a first capacitor C10; a second capacitor C20; and an output section. The first capacitor C10 and the second capacitor C20 are connected in series.

Figure 11A:
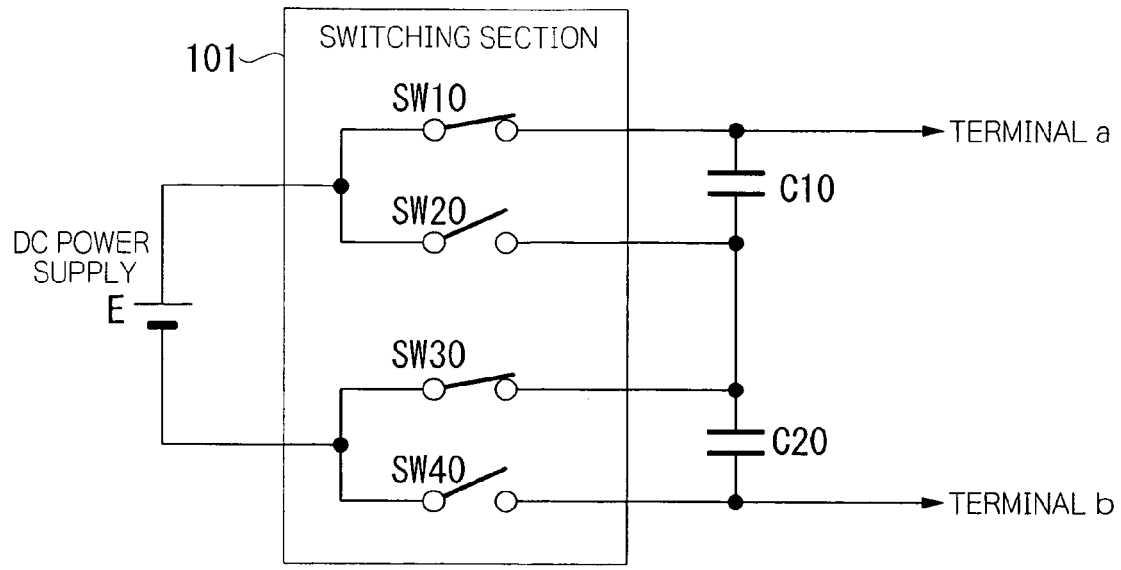
FIGS. 11A and 11B are diagrams showing a basic circuit that uses capacitors.
Figure 11B:
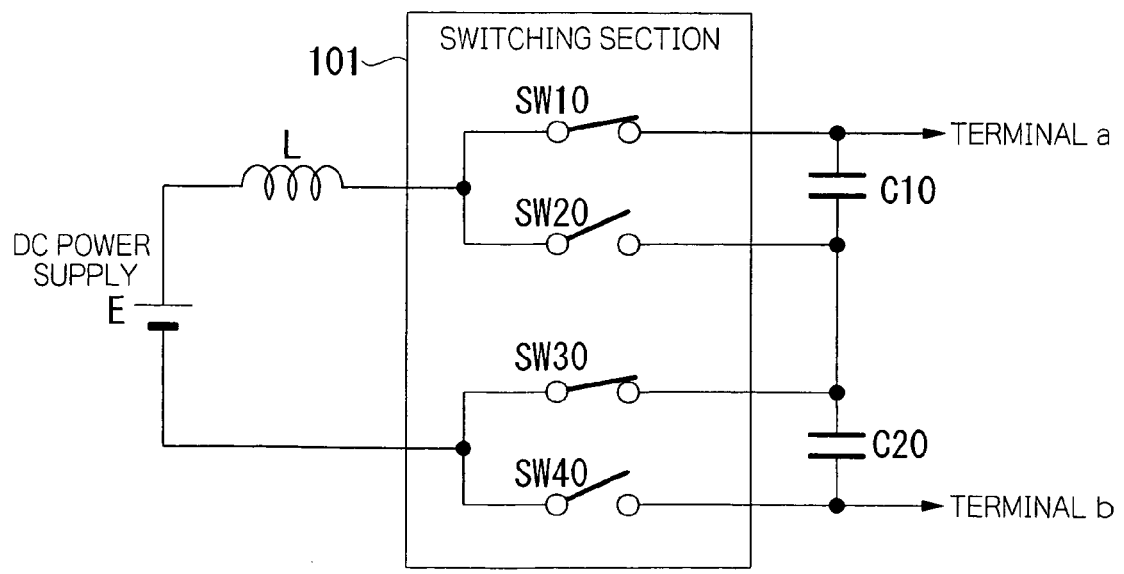

FIG. 11A is a diagram showing a basic circuit that uses capacitors. The DC/DC converter of the present invention has a special feature in that a base circuit shown in FIG. 11A comprising a switching section 101 and two capacitors C10 and C20 connected in series, has as shown in FIG. 11B, an inductor L further added thereto. The circuit shown in FIG. 11A is itself provided with functions as a two times voltage step-up circuit, a conduction circuit, and a regeneration circuit, and these functions are extended by adding the inductor L. The details are described later.

Returning to FIG. 10, an input voltage detection section 103 in a control circuit section 102 has a function that detects the power supply voltage E. An output voltage detection section 104 has a function that detects the output voltage of the output section. A voltage comparison section 105 has a function that compares the power supply voltage E detected by the input voltage detection section 103 with the output voltage detected by the output voltage detection section 104.

Moreover, a regeneration load detection section 106 has a function that determines whether or not a regeneration load (the load in the situation where a motor or the like is generating electricity during regenerative braking) is connected, based on the result of a comparison between the power supply voltage and the output voltage in the voltage comparison section 105, for example, in the case where the voltage of the output section has increased more than necessary, for example "output voltage>2×power supply voltage E" at the time of two times step-up. Moreover, a switching control section 110 has a function that controls the switches SW10 to SW40 inside the switching section 101 to turn ON and OFF. Also, the switching control section 110 has a function that performs duty control of ON/OFF time of the switches SW10 to SW40 in the switching section 101, and that adjusts the voltage of the output section to an optional value.

The voltage comparison section 105 and the switching control section 110 in this control circuit section 102 may be realized with dedicated hardware, or the same function may be realized by providing a computer system, such as a memory and a CPU in the control circuit section 102, and loading a program (not shown in the figures) for realizing the function of the voltage comparison section 105 and the switching control section 110, into the memory and executing the program.

According to the construction shown in FIG. 10, in the DC/DC converter of the present invention, by adjusting ON/OFF control of the first switch SW10, the second switch SW20, the third switch SW30 and the fourth switch SW40, three types of operation mode can be realized, namely: a voltage step-up mode (for example, step-up to an optional voltage within a range from one to two times the power supply voltage); a conduction mode (rectification mode); and a power supply regeneration mode. The selection of the operation mode is determined by an application. In the case where the present invention is employed for an electric vehicle, for example, the two times voltage step-up mode is used at the time of high speed running, and a one times voltage step-up is used at the time of low speed running.

Furthermore, the circuit shown in FIG. 11A (the circuit without the inductor L) itself has the functions of; a two times voltage step-up mode, a conduction mode and a regeneration mode as described above. Of these, the two times voltage step-up mode is briefly described. The other modes are described in the examples accordingly.

Figure 12A:
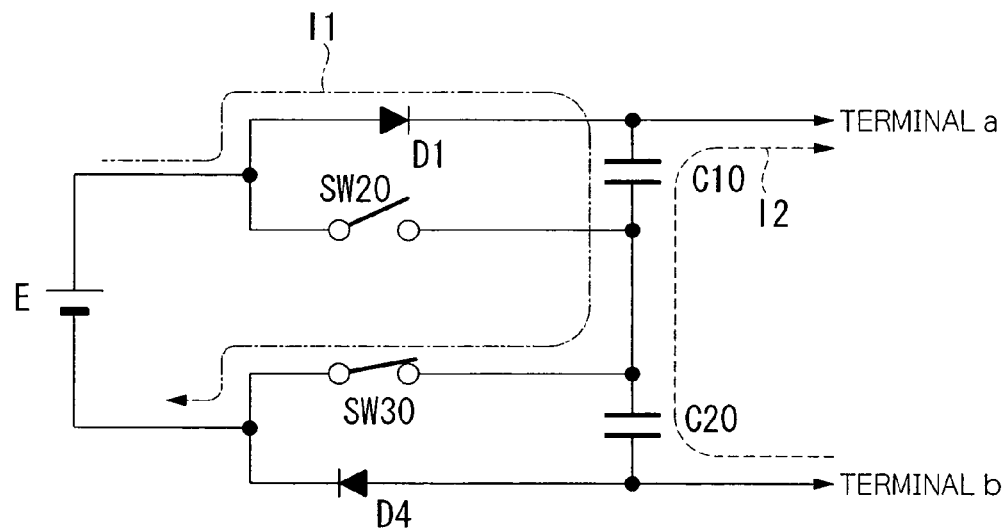
FIGS. 12A and 12B are diagrams for explaining a principle of two-times voltage step-up of the basic circuit shown in FIG. 2.
Figure 12B:
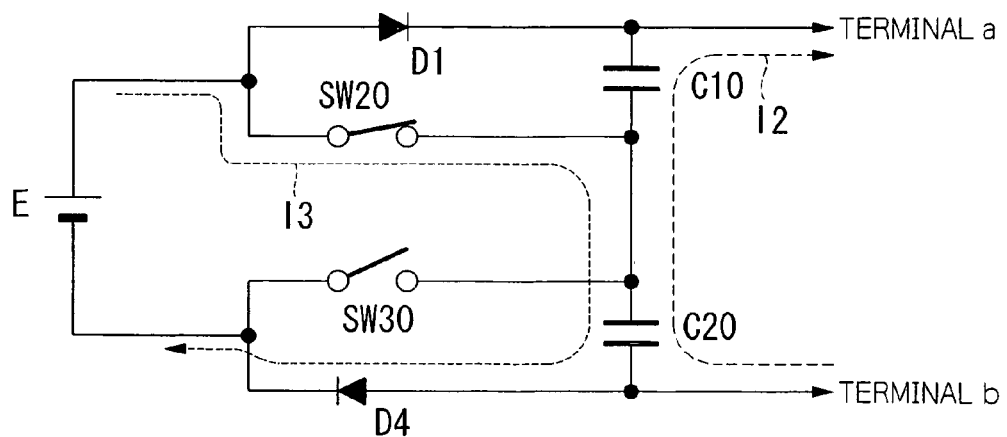

FIGS. 12A and 12B are diagrams for describing the two times voltage step-up mode. The switch SW10 and the switch SW40 in the circuit shown in FIG. 1A have been replaced with diodes. That is, in the two times voltage step-up mode shown in FIG. 12A, the directions of electric current flowing to the switch SW10 (replaced with the diode D10) and the switch SW40 (replaced with the diode D40) is respectively fixed always in one direction. This mode only uses the switching operation (rectification) of the diodes, and has been devised so that the number of switches that control switching is reduced.

In FIGS. 12A and 12B, the switch SW30 is first turned ON and the switch SW20 is turned OFF, and the capacitor C10 is charged to the power supply voltage E. Next, the switch SW20 is turned ON and the switch SW30 is turned OFF, and the capacitor C20 is charged to the power supply voltage E. This switching control is alternately repeated. As a result, the capacitor C10 and the capacitor C20 are respectively charged to the voltage E, and since the capacitor C10 and the capacitor C20 are connected in series, a voltage output of approximately 2 E can be obtained at the output section.

Note that FIGS. 12A and 12B show examples of the switch SW10 replaced with the diode D10, and the switch SW40 replaced with the diode D40. However, the DC/DC converter of the present invention actively uses diodes as a substitute for switches in the case where the switching operation of a diode (the operation in which electric current flows in one direction) can be used. A specific example is shown in the examples section.

SECOND EXAMPLE

Figure 13A:
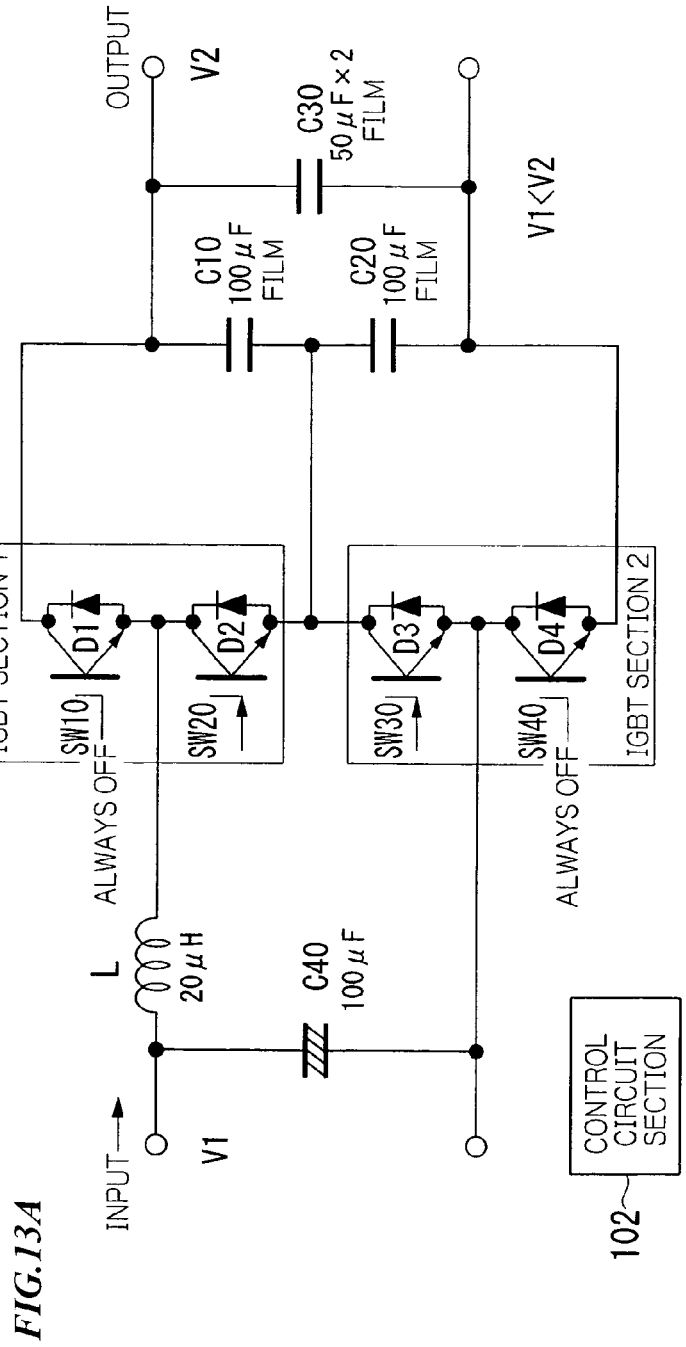
FIGS. 13A and 13B are diagrams for explaining a voltage step-up mode of the DC/DC converter of the present invention.

Next, an example of the present embodiment is described. FIG. 13A is a diagram for describing a voltage step-up mode of the DC/DC converter of the present invention.

The DC/DC converter shown in FIG. 13A has: a DC power supply input section (power supply voltage V1); a smoothing capacitor (electrolytic capacitor) C40 on the input side; an inductor L; an IGBT section 1 and an IGBT section 2 having two (a pair of) built-in IGBT devices; and capacitors C0, C20 and C30. The capacitors C0, C20, and C30 are film capacitors. Moreover, the control circuit section 2 is the same as that shown in FIG. 10. This electrolytic capacitor C40 is provided to lower the impedance of the power supply (for example, in the case where the power supply is distanced from the circuit, and the power supply wiring is lengthened, the impedance of the power supply increases and a control malfunction may occur, however the electrolytic capacitor C40 prevents this).

An IGBT device (SW10) and a flywheel diode D1 on the upper side of the IGBT section 1 correspond to the switch SW10 shown in FIG. 10. An IGBT device (SW20) and a flywheel diode D2 on the lower side of the IGBT section 1 correspond to the switch SW20 shown in FIG. 10. An IGBT device (SW30) and a flywheel diode D3 on the upper side of the IGBT section 2 correspond to the switch SW30 shown in FIG. 10. Moreover an IGBT device (SW40) and a flywheel diode D4 on the lower and upper side of the IGBT section 2 correspond to the switch SW40 shown in FIG. 10.

In the DC/DC converter shown in FIG. 13A, the switch SW10 and the switch SW40 are always turned OFF, and as shown in FIG. 4B, a gate voltage is applied from the control circuit section 2 so that the switch SW20 of the IGBT section 1, and the switch SW30 of the IGBT section 2 are alternately turned ON and OFF.

Figure 13B:
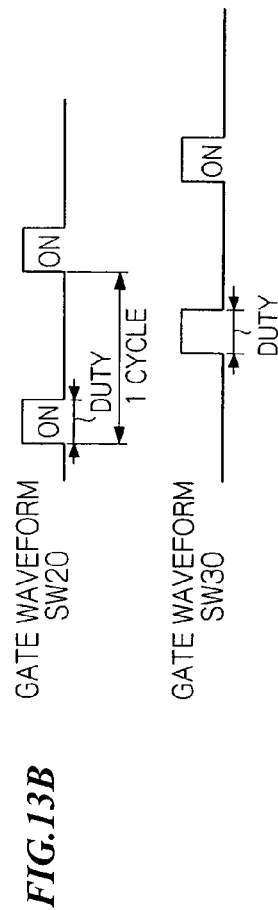

Moreover, as shown in FIG. 13B, by changing the duty (DUTY) of the ON time of each of the switches SW20 and SW30 within the range of 0 to 50% (actually, a value less than 50% in consideration of the dead time for preventing the switch SW10 and the switch SW20 from short circuiting, for example 45%), the input voltage can be stepped up one to two times, and output. That is, the output voltage can be continuously varied to an optional value by changing the duty. The details are described later.

Figure 14A:
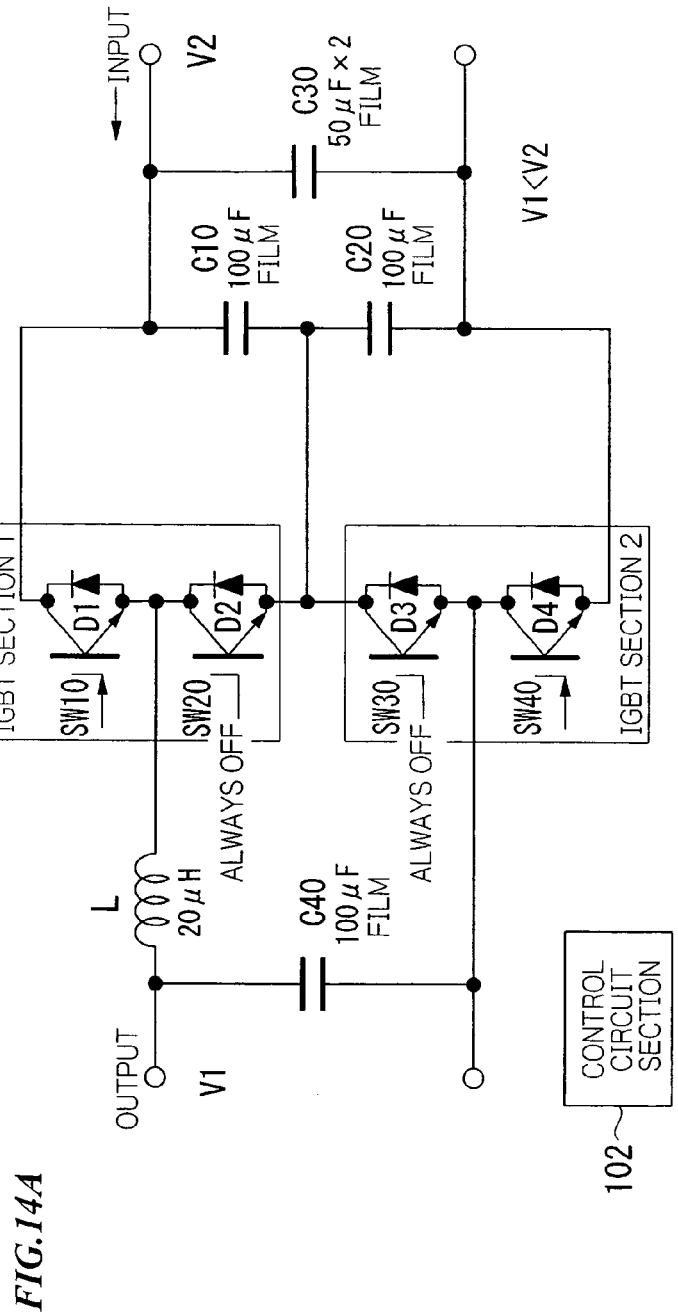
FIGS. 14A and 14B are diagrams for explaining a voltage step-down mode of the DC/DC converter of the present invention.

FIG. 14A is a diagram for describing a voltage step-down operation mode (regeneration mode) of the DC/DC converter of the present embodiment. In the regeneration mode, since electric power is returned from the regeneration load side, the input and the output become opposite compared with FIG. 13A.

Figure 14B:
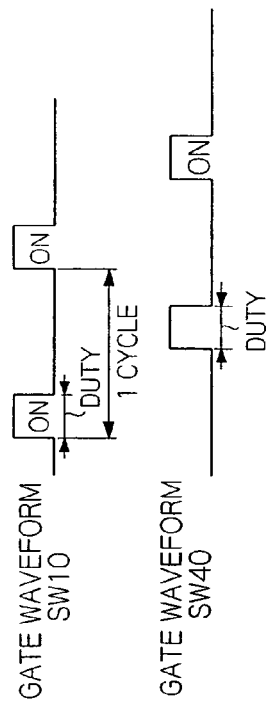

In this voltage step-down operation mode (regeneration mode), the switch SW20 and the switch SW30 are always turned OFF, and as shown in FIG. 14B, a gate voltage is applied so that the switch SW10 of the IGBT section 1, and the switch SW40 of the IGBT section 2 are alternately turned ON and OFF.

Moreover, as shown in FIG. 14B, by changing the duty (DUTY) of the ON time of each of the switches SW10 and SW40 within the range of 0 to 50% (actually, a value less than 50% in consideration of the dead time for preventing the switch SW10 and the switch SW40 from short circuit, for example 45%), the input voltage (regeneration voltage V2), can be appropriately stepped down for example, one times to 0.5 times, and output. In the case where the voltage step-down ratio is low, the switch SW40 is always turned ON, and only the switch SW10 is turned ON and OFF (this operation is described later.)

Next, each mode of operation is described in detail. First of all, the voltage step-up operation of the DC/DC converter of the present embodiment is described with reference to the schematic diagrams of the voltage step-up operation in FIG. 15A. In the DC/DC converter of the present invention, simultaneous to the capacitors C10 and C20 being alternately charged, magnetic energy is accumulated in the inductor L and voltage step-up is performed. FIG. 15A and FIG. 15B show the operation in the case of charging the capacitor C20, and FIG. 1C and FIG. 15D show the operation in the case of charging the capacitor C10.

First, the operation of charging the capacitor C20 is described. Referring to FIG. 15A and FIG. 15B, when at time t1 a gate voltage is applied to the switch SW2 in the IGBT section 1 and the switch SW2 is turned on (the other switches, SW1, SW3 and SW4 are turned OFF), a charging current I1 flows along the route through power supply E→inductor L→switch SW2→capacitor C2→flywheel diode D4→power supply E. At this time, the capacitor C20 is charged by the power supply E (see the charge current waveform I1:C20 in FIG. 15B). Moreover at this time, magnetic energy is accumulated in the inductor L. Furthermore, since at the same time the capacitors C10 and C20 are also connected to the capacitor C30 and a load R, the capacitor C30 is charged and an output current flows to the load R.

Next, at time t2, when the switch SW2 is turned OFF (the other switches, SW1, SW3 and SW4 are also turned OFF), the charging current I2 accumulated in the inductor L due to the magnetic energy flows along the route through inductor L→flywheel diode D1→capacitor C10→capacitor C20→flywheel diode D4→power supply E (see the discharge current waveform I2:L in FIG. 15B).

Next, the operation of charging the capacitor C10 is described. Referring to FIG. 15C and FIG. 15D, when at time t3 a gate voltage is applied to the switch SW3 in the IGBT section 2 and the switch SW3 is turned on (the other switches, SW1, SW2 and SW4 are turned OFF), a charging current I3 flows along the route: power supply E→inductor L→flywheel diode D1→capacitor C10→switch SW3→power supply E. At this time, the capacitor C10 is charged by the power supply E (see the charge current waveform I3:C1 in FIG. 15D). Moreover at this time, magnetic energy is accumulated in the inductor L. Furthermore, since at the sane time the capacitors C10 and C20 are also connected to the capacitor C30 and a load R, the capacitor C30 is charged and an output current flows to the load R.

Next, at time t4, when the switch SW3 is turned OFF (the other switches, SW1, SW2 and SW4 are also turned OFF), the charging current I4 accumulated in the inductor L due to the magnetic energy flows along the route through inductor L→flywheel diode D1→capacitor C10→capacitor C20→flywheel diode D4→power supply E (see the discharge current waveform I4:L in FIG. 15D).

As a result, a voltage step-up operation can be performed by flowing the charging currents (I1 and I3) from the power supply E alternately to the two capacitors C10 and C20 connected in series, and by accumulating the magnetic energy in the inductor L by the charging currents (I1 and I3) to the capacitors C10 and C20, and charging the capacitors C10 and C20 by the discharge current (I2 and I4) of this inductor L.

As shown in FIG. 15B, by changing the duty (DUTY) of the ON time of each of the switches SW20 and SW30 within the range of 0 to 50% (actually, a value less than 50% in consideration of the dead time for preventing the switch SW20 and the switch SW30 from short circuiting, for example 45%), the input voltage can be arbitrarily stepped up one to two times and output. That is, by changing the duty ratio, and by controlling (adjusting) the charging current from the power supply E to the capacitors C10 and C20, and the discharging current of the inductor L, the output voltage can be continuously varied to an optional value.

Figure 16A:
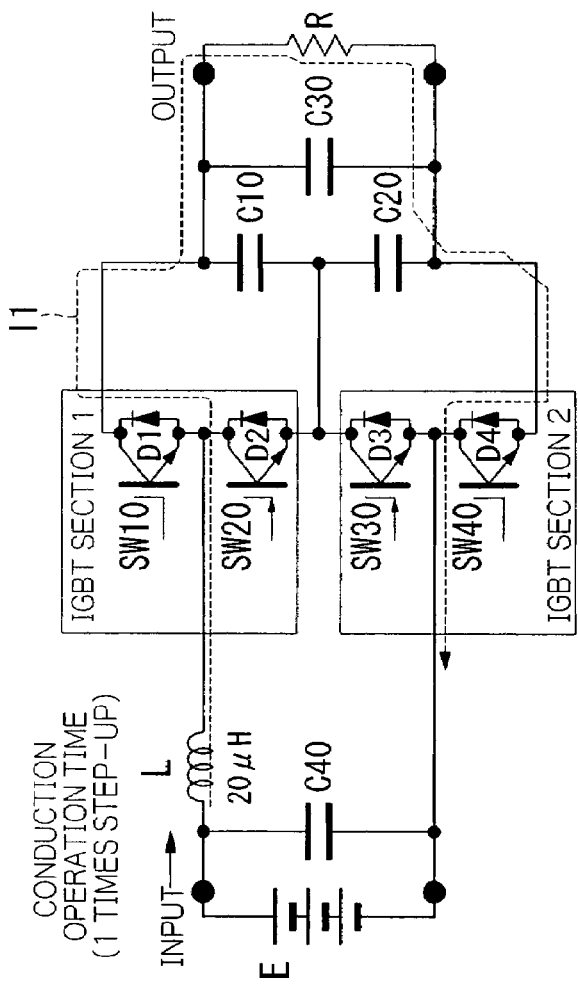
FIGS. 16A and 16B are diagrams showing an example of operation as a normal rectification circuit (1 times voltage step-up circuit).
Figure 16B:
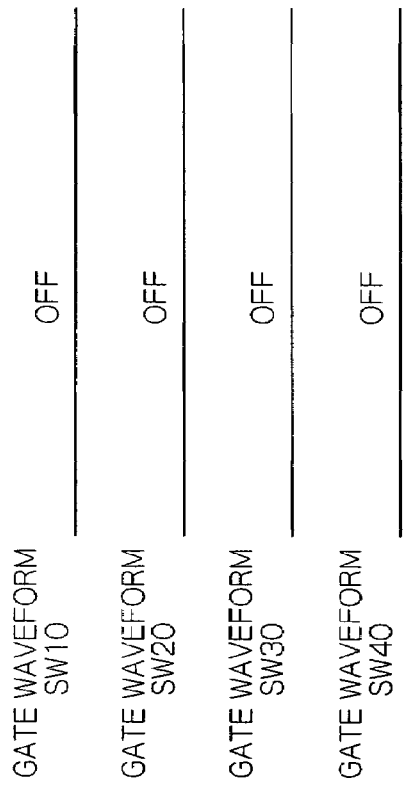

The DC/DC converter of the present invention can function not only as a voltage step-up circuit but also as a rectification circuit. FIG. 16A shows an example of the case where the switch SW10, the switch SW20, the switch SW30 and the switch SW40 are always turned OFF, and it is operated as a normal rectification circuit (conduction circuit: one times voltage step-up circuit).

When switching of the switches SW10 to SW40 is stopped, the electric current I1 flows to the load R along the route from the power supply E to the inductor L, the flywheel diode D1 of the IGBT section 1, the load R, and the flywheel diode D4. In this case, the capacitors C10 and C20 do not specially contribute to voltage step-up, and the output voltage is approximately one times the input voltage.

Next, the operation of the voltage step-down mode (regeneration mode) of the DC/DC converter of the present embodiment is described. For example, in the case where a motor is used as a load on the output side, and the revolution speed of the motor is controlled to decrease (regenerative braking operation), and the voltage on the output (load) side increases, the voltage on the output (load) side is stepped down (the energy is returned to the input side), and the power supply such as a battery on the input side, can be charged.

Figure 17A:
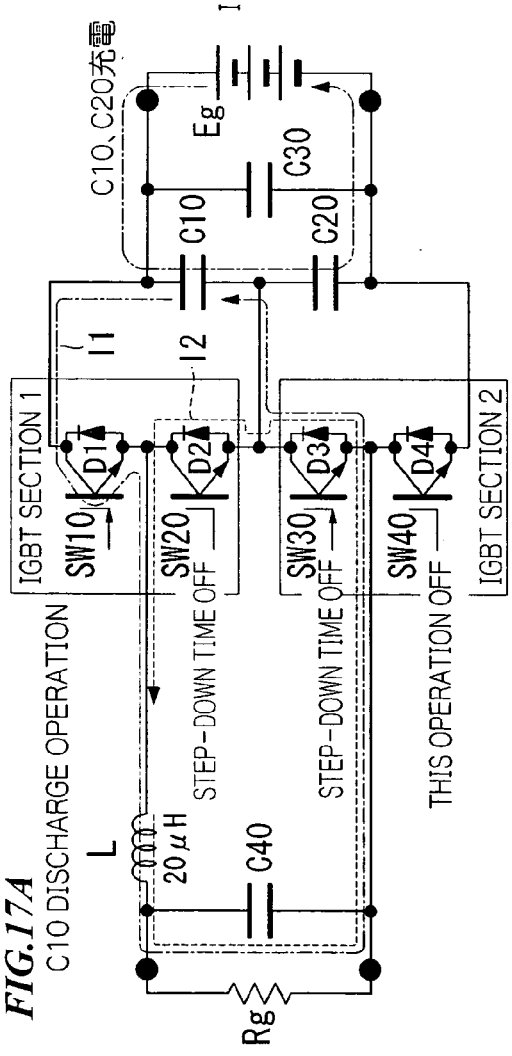
FIGS. 17A to 17D are first diagrams showing an example of a voltage step-down operation.
Figure 17B:
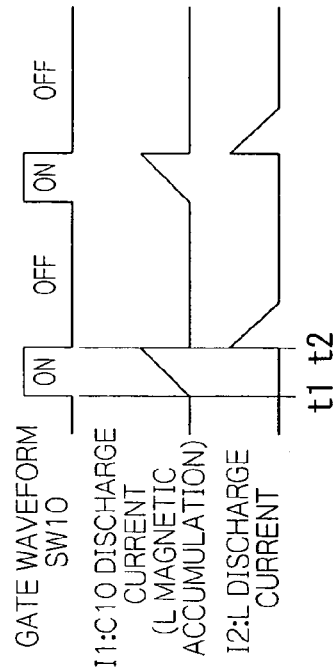

FIGS. 17A and 17B are diagrams for describing the operation of the voltage step-down mode (regeneration mode). In the regeneration mode, the switch SW2 of the IGBT section 1 and the switch SW3 of the IGBT section 2 are always turned OFF, and the switch SW1 of the IGBT section 1 and the switch SW4 of the IGBT section 2 are controlled to be alternately turned ON and OFF.

In the case where the voltage step-down ratio is high, that is, in the case where the regeneration load is large and the regeneration voltage is large, then for example, in the case where the ratio of the power supply Eg (voltage of the output section) at the time of regeneration shown in FIGS. 17A and 17B, and the voltage applied to the load Rg (power supply of the DC power supply input section) is approximately "1:0.5" to "1:0.8", the switch SW1 and the switch SW4 are alternately turned ON and OFF, and the capacitor C10 and the capacitor C20 are alternately turned ON and OFF.

First, the operation in the case where the switch SW1 is turned ON and the regenerative charge accumulated in the capacitor C10 is discharged is described. Referring to FIGS. 17A and FIG. 17B, at time t1, when the switch SW1 is turned ON (the other switches, SW2, SW3 and SW4 are turned OFF), the electric current I1 flows along the route through capacitor C1→switch SW1→inductor L→load Rg→flywheel diode D3→capacitor C1. At this time, the load Rg (power supply of the DC power supply input section) is charged by the capacitor C10 (see the discharge current waveform I1:C1 in FIG. 17B). Moreover, at this time, magnetic energy is accumulated in the inductor L.

Next, at time t2, when the switch SW1 is turned OFF (the other switches, SW2, SW3 and SW4 are also turned OFF), the charging current I2 due to the magnetic energy accumulated in the inductor L flows along the route through inductor L→load Rg→flywheel diode D30→flywheel diode D20→inductor L (see the discharge current waveform I2:L in FIG. 17B).

As a result, the regenerative electric power accumulated in the capacitor C10 is returned to the power supply side, and the voltage of the capacitor C10 drops.

Figure 17C:
Figure 17D:
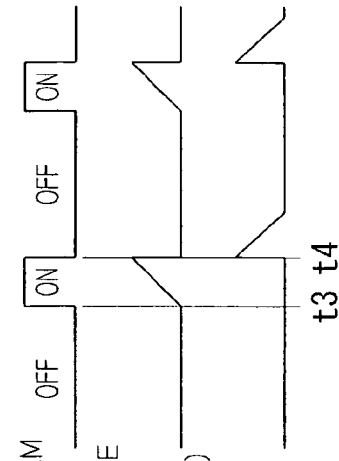

Next, the operation of discharging the capacitor C20 is described. Referring to FIG. 17C and FIG. 17D, when at time t3 a gate voltage is applied to the switch SW40 in the IGBT section 2 and the switch SW40 is turned on (the other switches, SW10, SW20 and SW30 are turned OFF), a discharge current I3 flows along the route through capacitor C20→flywheel diode D20→inductor L→load Rg→switch SW40→capacitor C20. At this time, the load Rg (power supply of the DC power supply input section) is charged by the capacitor C20 (see the discharge current waveform I3:C20 in FIG. 17D). Moreover, at this time, magnetic energy is accumulated in the inductor L.

Next, at time t4, when the switch SW40 is turned OFF (the other switches, SW10, SW20 and SW30 are also turned OFF), the charging current I4 due to the magnetic energy accumulated in the inductor L flows along the route through inductor L→load Rg→flywheel diode D30→flywheel diode D20→inductor L (see the discharge current waveform I4:L in FIG. 17D).

As a result, the regenerative electric power accumulated in the capacitor C20 is returned to the power supply side, and the voltage of the capacitor C20 drops.

In this manner, by alternately discharging the capacitors C10 and C20, regenerative electric power from the regeneration load connected to the output section can be returned to the input section. Even if the regenerative electric power increases, and the voltage of the output section rises, and the electric power to be returned to the opposite direction (output section→DC power supply input section) becomes large, the regeneration current simply increases, and the operation can be constantly performed with the same duty ratio.

Figure 18A:
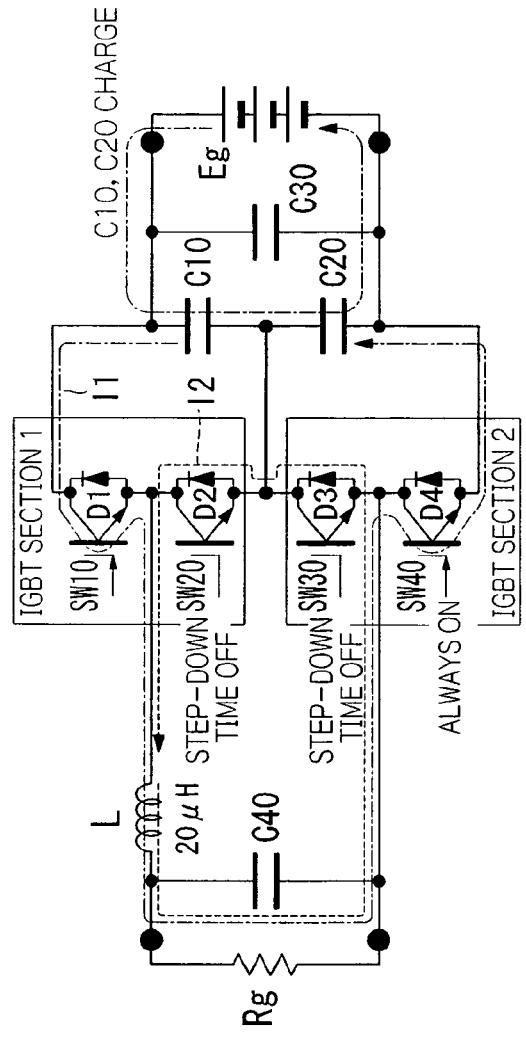
FIGS. 18A and 18B are second diagrams showing an example of a voltage step-down operation.
Figure 18B:
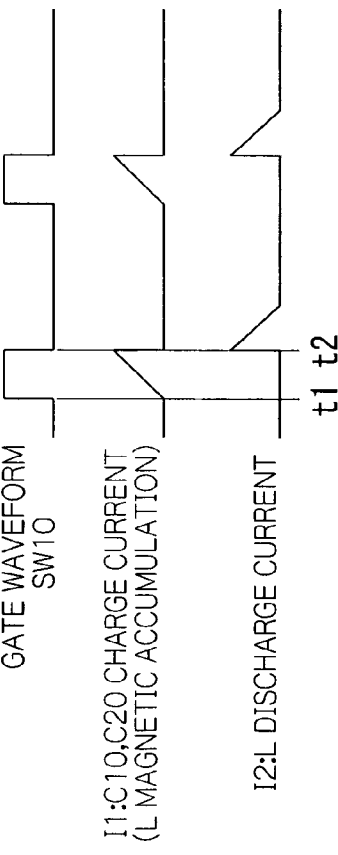

Moreover, FIGS. 18A and 18B are diagrams for describing the operation in the case where the voltage step-down ratio is low (where regeneration load is small). In the case where the voltage step-down ratio is low, then for example, in the case where the ratio of the power supply Eg (voltage of the output section) at the time of regeneration shown in FIG. 18A, and the voltage applied to the load Rg (power supply of the DC power supply input section) is approximately "1:0.8" to "1:1", the switch SW20 and the switch SW30 are turned OFF, and the switch SW40 is always turned ON, and only the switch SW10 is controlled to be turned ON and OFF.

First, at time t1, the switch SW1 is turned ON, and the electric current I1 flows through the route: capacitor C10→switch SW10→inductor L→load Rg→switch SW40→capacitor C20. At this time, the load Rg (power supply of the DC power supply input section) is charged by the capacitor C10 and the capacitor C20 (see the discharge current waveform I1:C1 and C2 in FIG. 18B). Moreover, at this time, magnetic energy is accumulated in the inductor L.

Next, at time t2, when the switch SW10 is turned OFF, the charging current I2 due to the magnetic energy accumulated in the inductor L flows along the route through inductor L→load Rg→flywheel diode D30→flywheel diode D20 (see the discharge current waveform I2:L in FIG. 18B).

In this manner, in the case where the voltage step-down ratio is low (where regeneration load is small), regeneration can be performed simply by controlling ON and OFF of the switch SW10.

Figure 19:
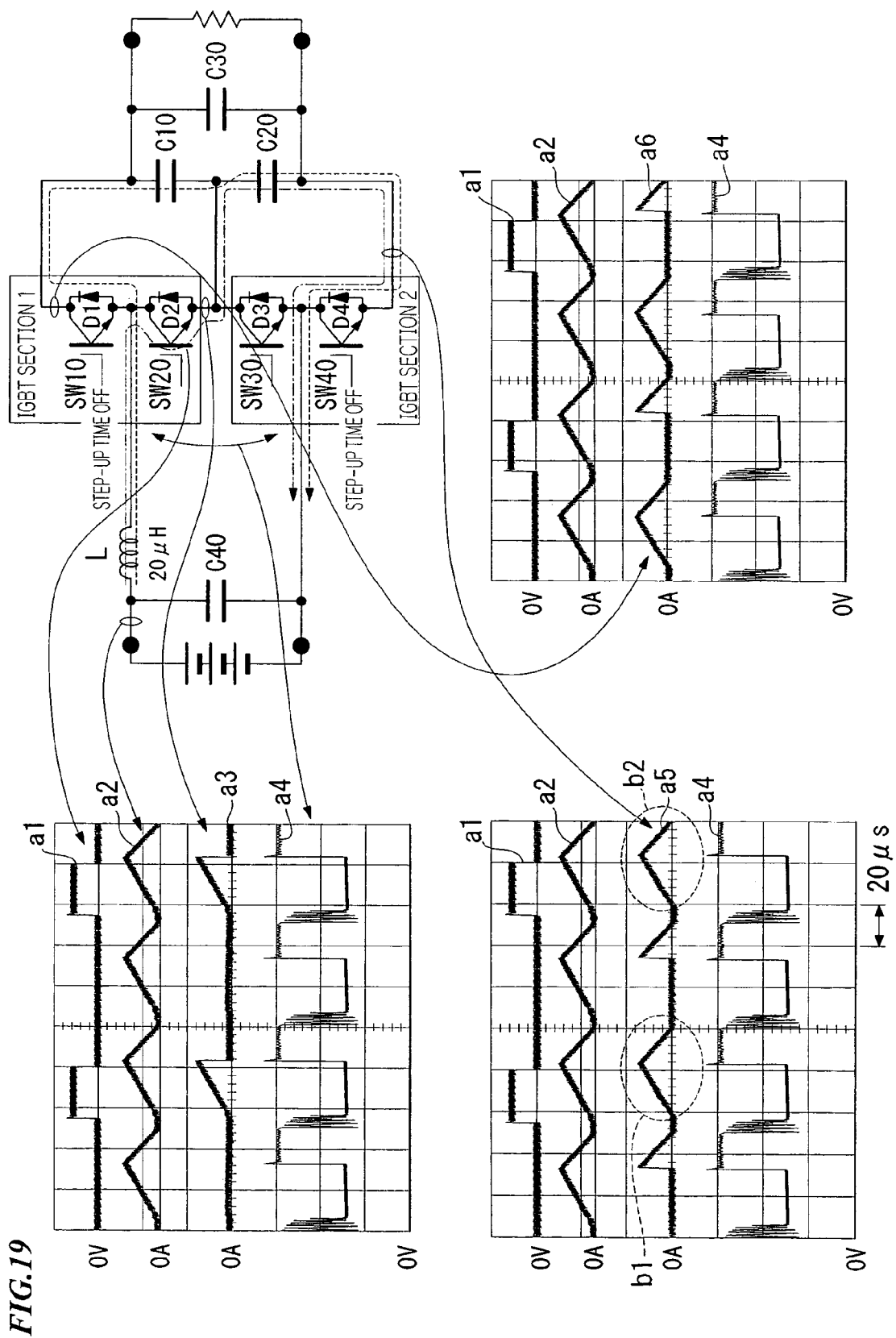
FIG. 19 is a diagram showing waveform measurement examples of each part of a specific circuit.

FIG. 19 is a diagram showing waveform measurement examples of each part of an actual circuit that uses the present invention. It shows waveforms during the voltage step-up operation (see FIG. 15B).

In FIG. 19, reference symbol a1 denotes a waveform of the gate for turning the switch SW20 ON and OFF. Reference symbol a2 denotes a waveform of the electric current flowing from the DC power supply input section to the circuit. Reference symbol a3 denotes a waveform of the electric current of the switch SW20. Reference symbol a4 denotes a waveform of the voltage between the output side of the inductor L and the negative electrode side of the DC power supply input section. Reference symbol a5 denotes a waveform of the electric current of the switch SW40. Reference symbol a6 denotes a waveform of the electric current of the switch SW10.

The parts of the electric current waveform b1 and b2 of the parts of the electric current a5 enclosed in circles, are waveforms in which the electric current a3 and the electric current a6 have been added.

Figure 20:
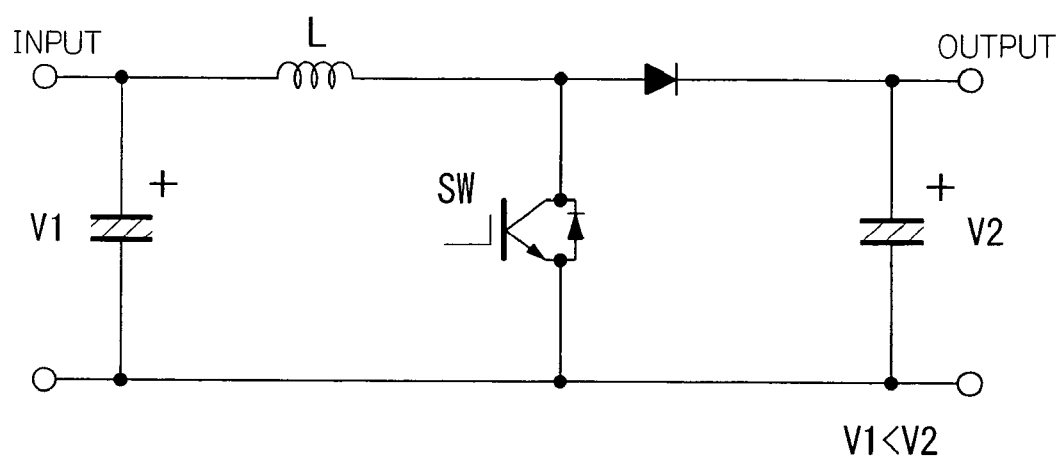
FIG. 20 is a diagram an example of a conventional voltage step-up DC/DC converter.
Figure 21A:
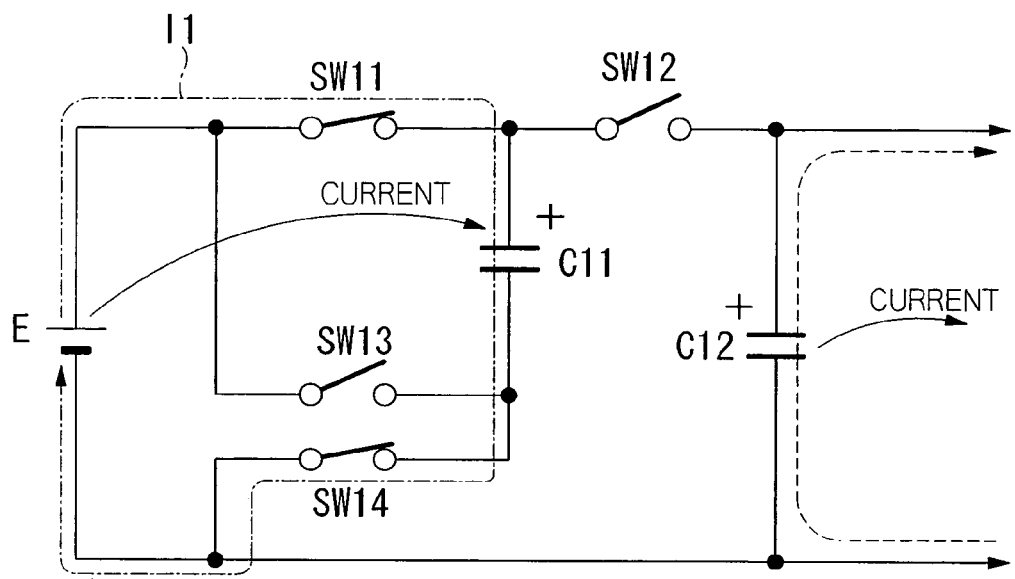
FIGS. 21A and 21B are diagrams showing examples of a conventional DC/DC converter that uses flying capacitors.
Figure 21B:
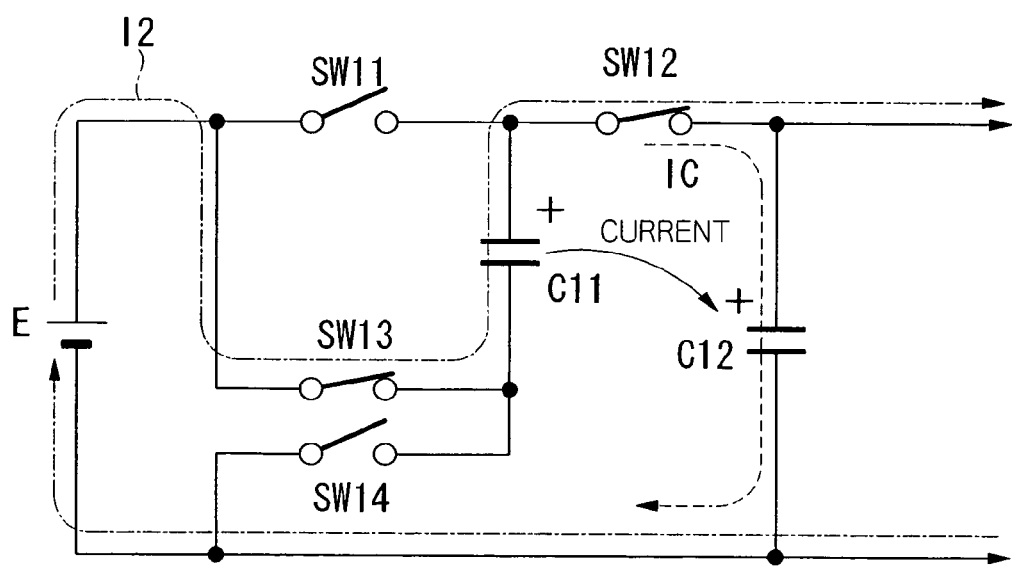

As described above, in the DC/DC converter of the present embodiment, the output voltage need not be fixed at two times the voltage, but may be set at an appropriate optional intermediate value at the time of voltage step-up or step-down. Moreover, since voltage step-up is basically achieved as a result of a voltage accumulation effect of the capacitors, the inductor L used for electric current control may be significantly smaller (for example, 20 µH) than the conventional type (see FIG. 20). As a result, according to the present invention, miniaturization, lightening, and price reduction of the DC/DC converter can be realized.

Moreover, at the time of a voltage step-down operation in the opposite direction, the inductor L functions as an inductor of a step-down transformer, and regeneration voltage step-down in the opposite direction is also possible.

Furthermore, by using film capacitors for the capacitors such as C10 and C20, the advantages of a film capacitor, such as its charge accumulation efficiency (approximately 80% for an electrolytic capacitor, and approximately 98% for a film capacitor), small size, light weight, and low price can be utilized, and high efficiency, miniaturization, and price reduction of the DC/DC converter can be realized.

Moreover, the switch SW10 and the switch SW20 can be formed in a single IGBT section 1, and the switch SW30 and the switch SW40 can be formed in the other IGBT section 2 (2 way type). Therefore, miniaturization, lightening, and wiring simplification of the switching circuit can be achieved.

Furthermore, since the output voltage is divided between the two capacitors C10 and C20, capacitors that handle high voltage are no longer required, and inexpensive capacitors can be used. In the case where capacitors are used in series in a normal circuit, a bleeder resistor is required for preventing voltage deviation. However, as this is not required for the present invention, electric power conversion efficiency can be improved accordingly. Also, the number of switches that control the switching is always two or less, so the switching control is easy. Moreover, by simply changing the switching device, the same circuit can be used for any of; a voltage step-up circuit, a conduction circuit, and a regeneration circuit.

In the example the case was described in which the inductor L is positioned on the positive electrode side of the power supply. However the same function and effect can be realized even if the inductor L is positioned on the negative electrode side of the power supply.

Moreover, in the example the case was described in which the first and second capacitors are film capacitors. However another type of capacitor such as a ceramic capacitor may be used. In the case where a ceramic capacitor is used, further miniaturization can be achieved while maintaining the charging efficiency at the same level as that of a film capacitor.

Furthermore, according to the present invention, a regeneration blocking mode can also be realized in the case where unwanted regeneration needs to be blocked. In this regeneration blocking mode, the switches SW1 and SW4 are always turned OFF, and only their respective flywheel diodes need function.

The second embodiment of the present invention has been described above. However, the DC/DC converter of the present invention is not limited to the examples shown and described above, and of course, various kinds of modifications may be made within a scope which does not depart from the gist of the present invention. For example, the principle of the present invention can be applied to a voltage step-up circuit that steps up more than three times.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description but is only limited by the scope of the appended claims.

INDUSTRIAL APPLICABILITY

The present invention can realize miniaturization, lightening, and price reduction of a DC/DC converter. Furthermore it has an effect in that high electric power conversion efficiency can be realized. Therefore, the present invention can be used for purposes such as a solar cell, a fuel cell, and the wind power generation, for increasing the generated voltage to the system, such as hybrid and electric vehicles, electrical household machinery and equipment for which the installation space is narrow.

What is claimed is:

1. A DC/DC converter comprising:
a DC power supply input section;
first and second capacitors connected in series;
an output section connected to said first and second capacitors;
a first element that connects a positive electrode side of said DC power supply input section to a positive electrode side of said first capacitor and a positive electrode side of said output section;
a second element that connects the positive electrode side of said DC power supply input section to a negative electrode side of said first capacitor and a positive electrode side of said second capacitor;
a third element that connects a negative electrode side of said power supply input section to the negative electrode side of said first capacitor and the positive electrode side of said second capacitor; and
a fourth element that connects the negative electrode side of said power supply input section to a negative electrode side of said second capacitor and a negative electrode side of said output section,
wherein two of said first to fourth elements are diodes and remaining two of the first to fourth elements are switches equipped with flywheel diodes, and
wherein said switches are respectively turned ON and OFF according to an operation mode, and one of voltage step-up and down operations is performed by making said first and second capacitors to function selectively.

2. The DC/DC converter according to claim 1, wherein the first and fourth elements are the diodes and the second and third elements are the switches.

3. The DC/DC converter according to claim 1, wherein the first and fourth elements are the switches and the second and third elements are the diodes.

4. The DC/DC converter according to claim 1, further comprising a switching control device that performs ON/OFF control of said switches, based on a designated operation mode, and the voltages of said DC power supply input section and said output section, and
wherein said switching control device controls ON/OFF time of said switches.

5. A DC/DC converter comprising:
a DC power supply input section;
first and second capacitors connected in series;
an output section connected to said first and second capacitors,
a first switch that connects a positive electrode side of said DC power supply input section to a positive electrode side of said first capacitor and a positive electrode side of said output section;
a second switch that connects the positive electrode side of said DC power supply input section to a negative electrode side of said first capacitor and a positive electrode side of said second capacitor;
a third switch that connects a negative electrode side of said power supply input section to the negative electrode side of said first capacitor and the positive electrode side of said second capacitor; and
a fourth switch that connects the negative electrode side of said power supply input section to a negative electrode side of said second capacitor and a negative electrode side of said output section,
wherein said first to fourth switches are transistor switches equipped with flywheel diodes, and
wherein said first to fourth switches are respectively turned ON and OFF according to an operation mode, and any one of the operations of: voltage step-up, conduction, and regeneration is performed by making said first and second capacitors to function selectively.

6. A DC/DC converter according to claim 5, wherein said transistor switches are IGBTs.

7. The DC/DC converter according to claim 5, wherein said first and second capacitors are film capacitors.

8. The DC/DC converter according to claim 5, wherein said first and second capacitors are ceramic capacitors.

9. The DC/DC converter according to claim 5, wherein at the time of a voltage step-up mode, by alternately turning said second and said third switches ON and OFF while said first and said fourth switches are always turned OFF, when said second switch is ON, said second switch and said flywheel diode of said fourth switch are electrically conducted, and when said third switch is ON, said flywheel diode of said first switch, and said third switch are electrically conducted, and
at the time of a conduction mode, said first to fourth switches are always turned OFF, and flywheel diodes of said first and fourth switches are electrically conducted, and
at the time of a regeneration mode, said second and third switches are always turned OFF, and by alternately turning said first and fourth switches ON and OFF, when said first switch is ON, said first switch and said flywheel diode of said third switch are electrically conducted, and when said fourth switch is ON, the flywheel diode of said second switch, and said fourth switch are electrically conducted.

10. The DC/DC converter according to claim 9, further having a regeneration blocking mode that blocks a regeneration operation with said first and fourth switches always turned OFF.

11. The DC/DC converter according to claim 5, further comprising:

a switching control device that performs ON/OFF control of said first to fourth switches, based on a designated operation mode and the voltages of said DC power supply input section and the voltage of output section, and wherein said switching control device controls ON/OFF time of said first to fourth switches.

12. The DC/DC converter according to claim 5, further comprising:

an inductor having first and second sides, the first side being connected to the second and third switches, and the second side being connected to the negative electrode side of said first capacitor and the positive electrode side of said second capacitor.

13. A recording medium comprising a computer readable program for executing on a computer, control of a plurality of switches in a DC/DC converter comprising a DC power supply input section, an inductor connected to said DC power supply input section, said plurality of switches; a plurality of capacitors and an output section connected to said plurality of capacitors, wherein said plurality of switches are transistor switches equipped with flywheel diodes, and wherein the program comprising a processing step to be executed by the computer, for controlling said plurality of switches to turn ON and OFF according to any one of the operation modes of: voltage step-up, conduction, and regeneration, and making said inductor and said plurality of capacitors function selectively.

14. The recording medium comprising a computer readable program according to claim 13, wherein the program is executed on a computer, by a processing step for ON/OFF control of said plurality of switches, based on a designated operation mode, and the voltage of said DC power supply input section detected by an input voltage detection section, and of said output section detected by an output voltage detection section.

15. The recording medium comprising a computer readable program according to claim 14, for executing on a computer, control of first to fourth switches in a DC/DC converter that is provided with: an inductor connected to a positive electrode side of a DC power supply input section; a first switch that connects the positive electrode side of said DC power supply input section to a positive electrode side of a first capacitor, and a positive electrode side of an output section through said inductor; a second switch that connects the positive electrode side of said DC power supply input section to a negative electrode side of said first capacitor and a positive electrode side of said second capacitor through said inductor; a third switch that connects the negative electrode side of said DC power supply input section to the negative electrode side of said first capacitor, and the positive electrode side of said second capacitor; and a fourth switch that connects the negative electrode side of said DC power supply input section to the negative electrode side of said second capacitor, and the negative electrode side of said output section, wherein processing for controlling said first to fourth switches to turn ON and OFF according to any one of the operation modes of: voltage step-up, conduction, and regeneration, and making said inductor and said plurality of capacitors function selectively, is executed on a computer.

16. The DC/DC converter according to claim 12, further comprising:

an inductor having first and second sides, the first side being connected to the second and third switches, and the secind side being connected to the negative electrode side of said firsr capacitor and the positive electrode side of said second capacitor.

17. A DC/DC converter comprising:

a DC power supply input section;

first and second capacitors connected in series, an output section connected to said first and second capacitors, an inductor connected to a positive electrode side or a negative electrode side of said DC power supply input section;

a first switch that connects the positive electrode side of said DC power supply input section to a positive electrode side of said first capacitor and a positive electrode side of said output section through said inductor;

a second switch that connects the positive electrode side of said DC power supply input section to a negative electrode side of said first capacitor and a positive electrode side of said second capacitor through said inductor;

a third switch that connects the negative electrode side of said power supply input section to the negative electrode side of said first capacitor and the positive electrode side of said second capacitor;

a fourth switch that connects the negative electrode side of said power supply input section to a negative electrode side of said second capacitor and a negative electrode side of said output section, wherein said first to fourth switches are transistor switches equipped with flywheel diodes, and wherein said first to fourth switches are respectively turned ON and OFF according to an operation mode, and any one of the operations of: voltage step-up, conduction, and regeneration is performed by making said inductor and said first and second capacitors to function selectively.

18. The DC/DC converter according to claim 17, further comprising a switching control device that performs ON/OFF control of said first to fourth of switches, based on a designated operation mode, and the voltages of said DC power supply input section and said output section, and wherein said switching control device controls ON/OFF time of said first to fourth switches.

19. The DC/DC converter according to claim 17, wherein said first and second capacitors are ceramic capacitors.

20. The DC/DC converter according to claim 17, wherein said transistor switches are IGBTs.

21. The DC/DC converter according to claim 17, wherein said first and second capacitors are film capacitors.

22. The DC/DC converter according to claim 17, wherein, at the time of a step-up mode, by alternately turning said second and said third switches ON and OFF while said first and said fourth switches are always turned OFF, when said second switch is ON, said second switch and said flywheel diode of said fourth switch are electrically conducted, and when said third switch is ON, said flywheel diode of said first switch, and said third switch are electrically conducted, and at the time of a conduction mode, said first to fourth switches are always turned OFF, and flywheel diodes of said first and fourth switches are electrically conducted, and at the time of a first regeneration mode, said second and third switches are always turned OFF, and by alternately turning said first and fourth switches ON and OFF, when said first switch is ON, said first switch and said flywheel diode of said third switch are electrically conducted, and when said fourth switch is ON, the flywheel diode of said second switch, and said fourth switch are electrically conducted, and at the time of a second regeneration mode, only said first switch is turned ON and OFF, and said second and third switches are always turned OFF, and said fourth switch is always turned ON, and when said first switch is ON, said first and fourth switches are electrically conducted, and when said first switch is OFF, the flywheel diodes of said second and third switches are electrically conducted.

23. The DC/DC converter according to claim 22, further having a regeneration blocking mode that blocks a regeneration operation by always turning OFF said first and fourth switches.

24. A recording medium comprising a computer readable program for executing on a computer, control of a plurality of switches in a DC/DC converter comprising a DC power supply input section, said plurality of switches, a plurality of capacitors and an output section connected to said plurality of capacitors, wherein said plurality of switches are transistor switches equipped with flywheel diodes, and wherein the computer carries out processing steps for controlling said plurality of switches to turn ON and OFF according to any one of the operation modes of voltage step-up, conduction, and regeneration, and making said plurality of capacitors function selectively.

25. The recording medium comprising a computer readable program according to claim 24, wherein said computer executes processing for ON/OFF control of said plurality of switches, based on a designated operation mode, the voltage of said DC power supply input section detected by an input voltage detection section, and of said output section detected by an output voltage detection section.

26. The recording medium comprising a computer readable program according to claim 25, wherein said computer executes processing for control of first to fourth switches in a DC/DC converter comprising a DC power supply input section, a first switch that connects a positive electrode side of said DC power supply input section to a positive electrode side of a first capacitor, and a positive electrode side of an output section, a second switch that connects the positive electrode side of said DC power supply input section to a negative electrode side of said first capacitor and a positive electrode side of said second capacitor; a third switch that connects the negative electrode side of said DC power supply input section to the negative electrode side of said first capacitor, and the positive electrode side of said second capacitor; and a fourth switch that connects the negative electrode side of said DC power supply input section to a negative electrode side of said second capacitor, and a negative electrode side of said output section, wherein said first to fourth switches are transistor switches equipped with flywheel diodes, and wherein, the computer further carries out processing for controlling said first to fourth switches to turn ON and OFF according to any one of the operation modes of: voltage step-up, conduction and regeneration, and making said plurality of capacitors function selectively.

27. The recording medium comprising a computer readable program according to claim 26, wherein the computer executes processing for ON/OFF control of said plurality of switches, based on a designated operation mode and the voltage of said the DC power supply input section detected by an input voltage detection section and the voltage of said output section detected by an output voltage detection section.

* * * * *